United States Patent
Silverstone et al.

(10) Patent No.: US 7,353,180 B1
(45) Date of Patent: Apr. 1, 2008

(54) SUPPLY CHAIN/WORKFLOW SERVICES IN A CONTRACT MANUFACTURING FRAMEWORK

(75) Inventors: Yaarit Silverstone, Atlanta, GA (US); Paul McGowan, Atlanta, GA (US)

(73) Assignee: Accenture LLP, Palo Alto, CA (US)

( * ) Notice: Subject to any disclaimer, the term of this patent is extended or adjusted under 35 U.S.C. 154(b) by 0 days.

(21) Appl. No.: 09/551,181

(22) Filed: Apr. 17, 2000

(51) Int. Cl.
*G06F 17/50* (2006.01)

(52) U.S. Cl. .............................................. 705/7; 705/26

(58) Field of Classification Search .................... 707/2, 707/3–4, 100, 101, 102, 104; 705/7, 26
See application file for complete search history.

(56) References Cited

U.S. PATENT DOCUMENTS

| | | | |
|---|---|---|---|
| 5,737,726 A * | 4/1998 | Cameron et al. ............. | 705/7 |
| 5,758,328 A | 5/1998 | Giovannoli | |
| 5,802,493 A * | 9/1998 | Sheflott et al. .............. | 705/1 |
| 5,862,223 A * | 1/1999 | Walker et al. .............. | 705/26 |
| 5,946,618 A * | 8/1999 | Agre et al. .................. | 455/428 |
| 5,950,173 A * | 9/1999 | Perkowski .................... | 705/26 |
| 5,960,420 A * | 9/1999 | Leymann et al. ............. | 707/1 |
| 6,041,306 A * | 3/2000 | Du et al. ....................... | 705/8 |
| 6,073,109 A | 6/2000 | Flores | |
| 6,078,900 A | 6/2000 | Ettl | |
| 6,128,624 A * | 10/2000 | Papierniak et al. ......... | 707/104 |
| 6,154,738 A * | 11/2000 | Call ............................. | 707/4 |
| 6,158,044 A | 12/2000 | Tibbetts | |
| 6,167,378 A * | 12/2000 | Webber, Jr. .................. | 705/8 |
| 6,236,999 B1 * | 5/2001 | Jacobs et al. ................ | 707/10 |
| 6,237,020 B1 | 5/2001 | Leymann et al. | |
| 6,249,772 B1 * | 6/2001 | Walker et al. .............. | 705/26 |
| 6,295,513 B1 * | 9/2001 | Thackston .................... | 703/1 |
| 6,301,574 B1 * | 10/2001 | Thomas et al. ............. | 707/1 |

(Continued)

FOREIGN PATENT DOCUMENTS

WO     WO99/13417     *   3/1999  .................... 17/30

OTHER PUBLICATIONS

Dilger Assess your assets (Manufacturers' maintenance departments can use advanced asset management systems to enhance workflow to make optimal use of assets such as equipment, information and people); 6, 1990 Manufacturing systems 28-38.*

(Continued)

*Primary Examiner*—Romain Jeanty
(74) *Attorney, Agent, or Firm*—Oppenheimer Wolff & Donnelly LLP

(57) ABSTRACT

The present disclosure provides for affording supply chain/workflow services in a contract manufacturing framework. First, a database including a plurality of service provider data structures is provided, wherein each service provider data structure includes a description of a particular service provider, and wherein the database further includes a request for proposal mechanism. Next, a particular service provider data structure is identified based on a request for proposal from a user utilizing the request for proposal mechanism. Finally, project management services are afforded to the user based on the request for proposal and the identified service provider data structure.

7 Claims, 20 Drawing Sheets

U.S. PATENT DOCUMENTS

| | | | |
|---|---|---|---|
| 6,343,279 | B1 | 1/2002 | Bissonette et al. |
| 6,356,905 | B1 * | 3/2002 | Gershman et al. ............ 707/10 |
| 6,397,197 | B1 * | 5/2002 | Gindlesperger .............. 705/37 |
| 6,397,219 | B2 * | 5/2002 | Mills ........................... 707/10 |
| 6,408,337 | B1 * | 6/2002 | Dietz et al. ................. 709/229 |
| 6,446,053 | B1 | 9/2002 | Elliott |
| 6,567,822 | B1 * | 5/2003 | Cudahy et al. .......... 707/104.1 |
| 6,587,877 | B1 | 7/2003 | Douglis et al. |
| 6,615,184 | B1 | 9/2003 | Hicks |
| 6,671,673 | B1 | 12/2003 | Baseman et al. |
| 6,883,022 | B2 * | 4/2005 | Van Wyngarden .......... 709/219 |
| 6,961,902 | B2 * | 11/2005 | Anecki et al. .............. 715/530 |
| 2002/0007333 | A1 | 1/2002 | Scolnik et al. |

OTHER PUBLICATIONS

Dilger, "Asset management, maintenance redefined"; Jul. 1997; Manufacturing systems V15n7 pp. 122-128; Dialog file 15, Accession No. 01493159.*

Cohn "Do it yourself electronic catalog RFP"; Oct. 1996, Catalog Age, v13n10 pp. 75, 79+, Dialog file 15 Accession No. 01302153.*

Hawash"Protecting Your Idea: What You ShouldKnow About Intellectual Property Rights"; Jan. 1999; Computer Gaming World, 244(1); Dialog file 275, Accession No. 02247738.*

Anecki, John A, Tang, Alan T., and Smet, Bernard F.; *An Interactive System for and Method of Automating the Generation of Legal Documents*, U.S. Appl. No. 60/187,444, filed Mar. 7, 2000.

*Dayco* Statement Regarding Related Applications.

* cited by examiner

SUPPLY CHAIN/WORKFLOW SERVICES IN A CONTRACT MANUFACTURING FRAMEWORK

FIELD OF THE INVENTION

The present invention relates to e-commerce and more particularly to contract manufacturing utilities.

BACKGROUND OF THE INVENTION

The ability to quickly, easily and efficiently communicate has always been a critical component, if not a necessity, for successful business operations. Today, as the global economy continues to expand, the ability to communicate is even more important. In partial response to these demands, sophisticated telecommunications equipment has been developed that permits users to quickly and easily place, receive, transfer and switch telephone calls as well as provide advanced features such as call accounting and voice messaging functionality. As these features have become widely available in local telecommunications equipment, such as private branch exchange (PBX) telephone switches, central offices, key and hybrid telephone systems (small telecommunications switches), call accounting systems, voice messaging systems, computer telephony interface (CTI) devices, automatic call distribution (ACD) devices, internet servers, etc., the demand for and installation of these systems has continued to expand. Often, a vast number of sites have layered or "integrated" two or more of the aforementioned devices and rarely are these different devices using the same operating system or of the same brand. More often, these differing devices include a mixture of operating systems and brands.

Such a mix of advanced telecommunications equipment, however, still typically relies upon a significant amount of manual human interaction to install, setup, operate, modify and maintain. Specifically, when a new telephone switch such as a PBX is to be installed at a facility, not only must the physical equipment itself be installed, but the equipment must be configured and programmed to operate as desired by the users of the facility. In fact, as more and more advanced features have become available in the equipment, the burden on the equipment installer to initially setup and configure these features for the specific needs of the end user and the burden on the technician in maintaining and modifying the equipment, the associated cable records for the equipment, and cable and service activities, has also increased.

When a telephone switch is accompanied by other telecommunications equipment, such as voice messaging systems, call accounting systems, CTI devices, wireless communication servers, or ACD devices, installation inconveniences are still further multiplied. Specifically, many of these ancillary pieces of equipment require additional entry of user information that is duplicative of information already entered into the main telephone switching equipment. In such case, not only must a technician program the main telecommunications switch, but additional time (and money) must be spent for programming ancillary equipment with similar information. Typically, these systems must be perfectly synchronized with each other or problems will occur. As a result, the total cost of the installation is greatly increased and data entry error rates are greatly increased.

To further complicate the installation and management of this equipment, each discrete change to one component of a telecommunications system often requires additional, similar changes to several other components. Furthermore, these additional changes typically must be done in a specific order and, since the operating system design of each of the telecommunications devices often changes from manufacturer to manufacturer and from device to device, by using an entirely different command structure for each different component. Therefore, when done manually, a technician must remember different command structures for each of the devices that require programming and also must remember the order in which the changes should be made and further may require different terminals, passwords, procedures, software, etc. Thus, a highly skilled technician having familiarity with all of the various types of equipment that make up the telecommunications system must perform these changes, or as is more common, multiple technicians are required. Clearly, with even a limited number of devices that require installation, maintenance, or programming, the likelihood of an error is greatly increased.

Since modern telecommunications equipment provides substantial flexibility in programming to accommodate varying preferences of different users, it is often necessary to begin the installation of such equipment by surveying users as to their desires and preferences so that these can be accurately reflected through programming of the equipment. This is typically done by distributing a questionnaire to each user to receive information sufficient to allow the equipment to be properly configured. Thus, not only is there a substantial time commitment needed to review and enter the information received on such questionnaires into the equipment, but significant effort on the part of each and every user is also required to complete the questionnaires. Typically, collection of this data and entry of it must wait until the system is installed, while in the present invention described below, this information can be stored externally, checked for omissions, checked for errors or duplications and processed months in advance.

Such disadvantages are particularly highlighted when an outdated PBX or central office system is replaced with an improved system, or a change is made in a present system. In such case each user is typically surveyed as to their preferences, as above, and this information is manually re-entered after installation of the improved PBX or central office system. Thus, since equipment upgrades impact each and every user in a facility, a significant devotion of resources is required. As a result, the benefits of advanced features provided by improved telecommunications equipment often does not outweigh the installation costs and thus many organizations either do not upgrade their equipment, or delay such upgrades as long as possible.

SUMMARY OF THE INVENTION

The present disclosure provides for affording supply chain/workflow services in a contract manufacturing framework. First, a database including a plurality of service provider data structures is provided, wherein each service provider data structure includes a description of a particular service provider, and wherein the database further includes a request for proposal mechanism. Next, a particular service provider data structure is identified based on a request for proposal from a user utilizing the request for proposal mechanism. Finally, project management services are afforded to the user based on the request for proposal and the identified service provider data structure.

In one embodiment of the present invention, a status of manufacturing processes performed by the identified service provider may be tracked. Optionally, the user may be allowed to inquiry service engineers. Also optionally, the user may be allowed to inquiry service chemists.

In one aspect of the present invention, the database may be accessed utilizing a network. Optionally, wherein the network may be the Internet.

BRIEF DESCRIPTION OF THE DRAWINGS

The invention will be better understood when consideration is given to the following detailed description thereof. Such description makes reference to the annexed drawings wherein.

DETAILED DESCRIPTION OF THE PREFERRED EMBODIMENTS

Figure 1:
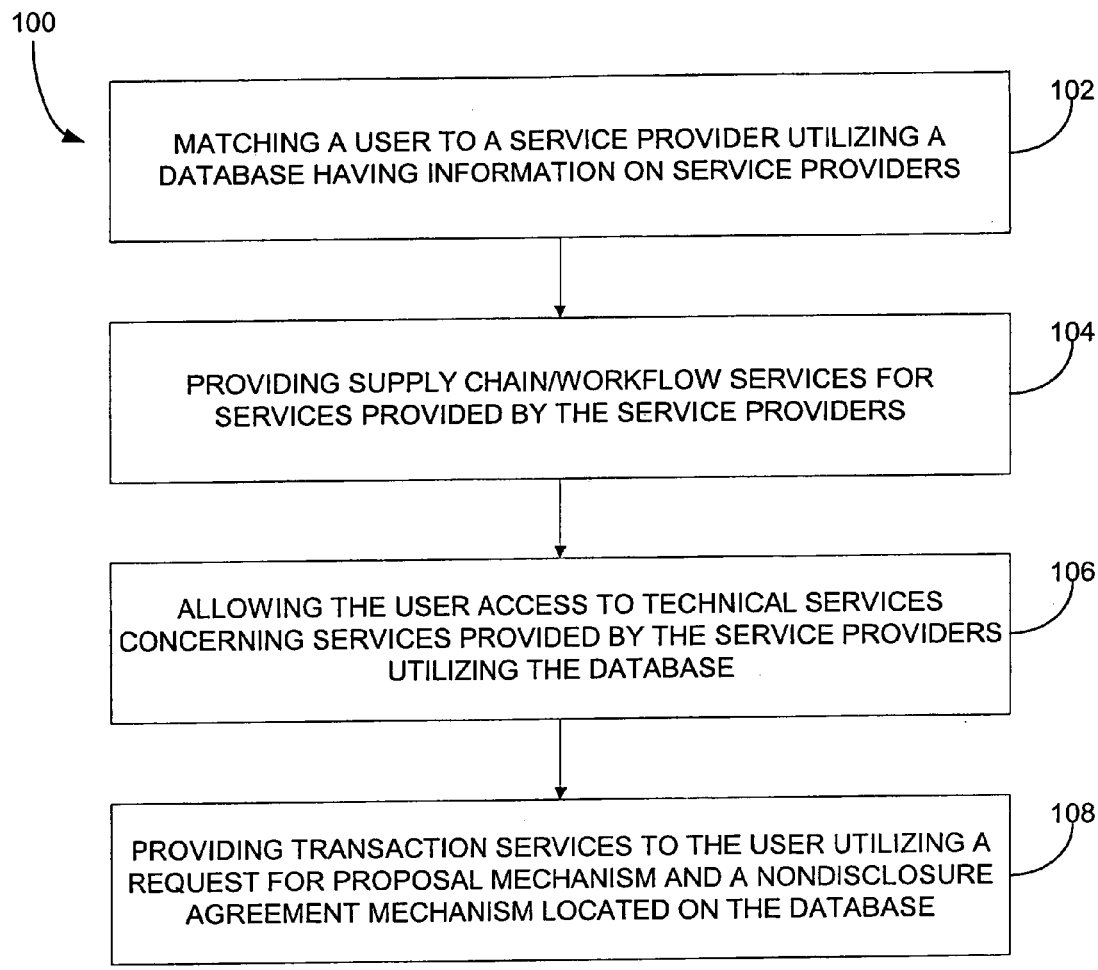
FIG. 1 is a flowchart illustrating a method for affording a contract manufacturing framework, in accordance with an embodiment of the present invention.

FIG. 1 is a flowchart illustrating a method 100 for affording a contract manufacturing framework, in accordance with an embodiment of the present invention. First, in operation 102, a user is matched to a service provider utilizing a database having information on service providers. Then, supply chain/workflow services for services provided by the service providers is afforded as indicated 104. In operation 106, the user is then allowed access to technical services concerning services provided by the service providers utilizing the database. Finally, transaction services are provided to the user utilizing a request for proposal mechanism and a nondisclosure agreement mechanism located on the database. See operation 108.

The present invention provides a virtual marketplace portal offering value-added services tailored for buyers and sellers, such as buyers and sellers of fine chemical contract manufacturing.

One embodiment of the present invention focuses on the pharmaceutical industry. This embodiment provides matching of customers of fine chemical contract manufacturing services with the optimal suppliers of those services, standardized RFP/RFI and related processes, access to supplier and product information and history, including capabilities, availability, and pricing.

As discussed in greater detail subsequently, the present invention further provides customer rating of supplier capabilities based on historical performance, bid/ask capability for multiple supplier responses, collaboration and project management services for integrating supplier and customer operations, technical services including process design and route optimization, access to related services (i.e. analysis, legal raw materials, regulatory, etc.), and creation of a marketplace community around fine chemical contract manufacturing.

The present invention allows pharmaceutical companies to see the latest industry thinking, and a summary view of what molecules are currently in the pipeline for my company and which stage they are in. Further, the present invention allows pharmaceutical companies to update data concerning any molecule, and initiate an Intellectual Property application to protect the molecule I just developed.

In use, the present invention is capable of building a database of trusted CMO's that a pharmaceutical company may have certified as capable of handling their business, and help them identify a CMO (or group of CMO's) to work with their team through the development process. Further, the present invention assist the pharmaceutical company in identifing testing organizations that meet their testing needs and manage the process for them.

Additionally, the present invention initiates the paperwork for FDA approval of the molecule and process, monitor the status for the pharmaceutical company, and helps the pharmaceutical company to understand whether it would be beneficial for them to pursue international registration of the molecules. (Perform a cost/benefit analysis). Finally, the present invention assists the pharmaceutical company with registration in the countries they choose, and encapsulates all of the above in a site, personalized to the pharmaceutical company's my needs.

For contract manufacturing organizations, the present invention posts information concerning the contract manufacturing organization's capabilities surrounding contract manufacturing (technologies, processes, equipment, etc), and assists the organization in selling their organization to pharmaceutical companies looking for a contract manufacturer and improve our overall conversion rate from "RFP-to-Contract."

In addition, the present invention shows contract manufacturing organization how to most effectively engage in business with the pharmaceutical companies, assists the organization to improve their supply chain by providing access to preferred vendors and ultimately allowing them to procure through the site.

Additionally, the present invention assists contract manufacturing organizations in forecasting and inventory management, provides a tool for them to monitor all the RFP's in the pipeline, and assists them manage the projects they have going on with multiple pharmaceutical companies.

Figure 2:
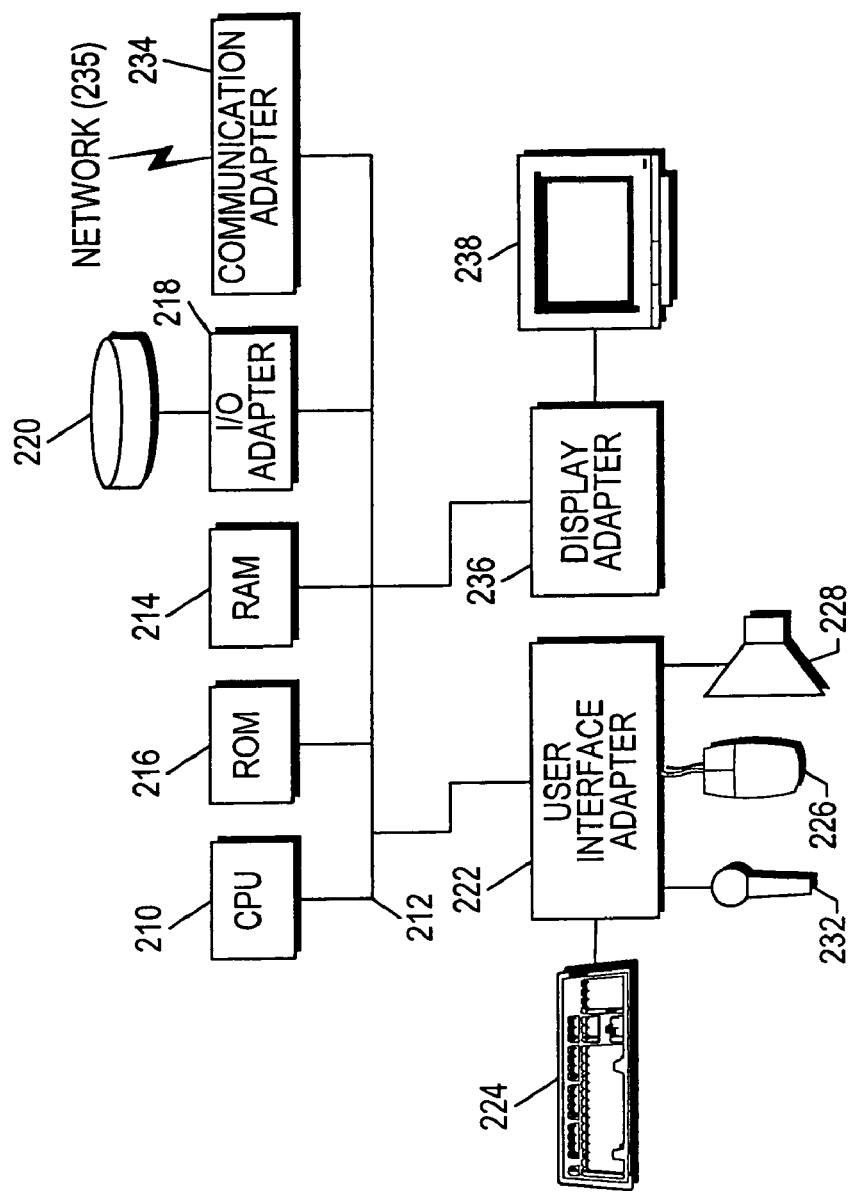
FIG. 2 is a schematic diagram of a hardware implementation of one embodiment of the present invention.

A preferred embodiment of a system in accordance with the present invention is preferably practiced in the context of a personal computer such as an IBM compatible personal computer, Apple Macintosh computer or UNIX based workstation. A representative hardware environment is depicted in FIG. 2, which illustrates a typical hardware configuration of a workstation in accordance with a preferred embodiment having a central processing unit 210, such as a microprocessor, and a number of other units interconnected via a system bus 212. The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network (e.g., a data processing network) and a display adapter 236 for connecting the bus 212 to a display device 238. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language—2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;
Restricted user interface capabilities;
Can only produce static Web pages;
Lack of interoperability with existing applications and data; and
Inability to scale.

Sun Microsystem's Java language solves many of the client-side problems by:

Improving performance on the client side;
Enabling the creation of dynamic, real-time Web applications; and
Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

Figure 3:
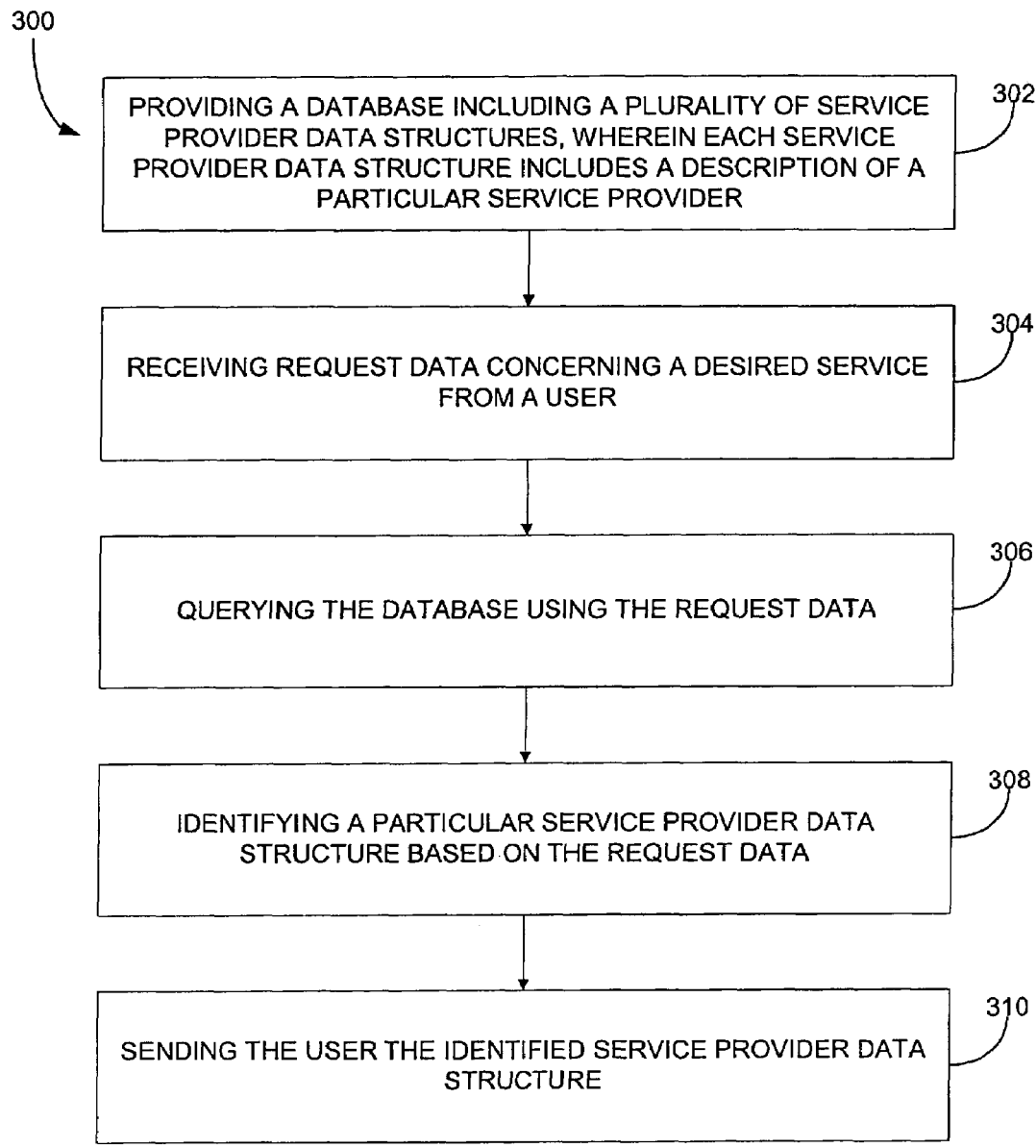
FIG. 3 is a flowchart illustrating a method for affording a matchmaking utility in a contract manufacturing framework, in accordance with an embodiment of the present invention.

FIG. 3 is a flowchart illustrating a method 300 for affording a matchmaking utility in a contract manufacturing framework, in accordance with an embodiment of the present invention. First, in operation 302, a database including a plurality of service provider data structures is provided, wherein each service provider data structure includes a description of a particular service provider. Then, in operation 304, request data concerning a desired service is received from a user. The database is then queried using the request data. A particular service provider data structure is then identified based on the request data. See operaiton 306. Finally, the user is sent the identified service provider data structure as indicated in operaiton 308.

In one embodiment of the present invention, the service provider data structures may include data concerning contract service providers. Optionally, the service provider data structures may further include data concerning legal services.

In an aspect of the present invention, the request data may include data concerning pharmaceuticals. In another aspect, the database may be accessed utilizing a network. Optionally, the network may be the Internet.

Figure 4:
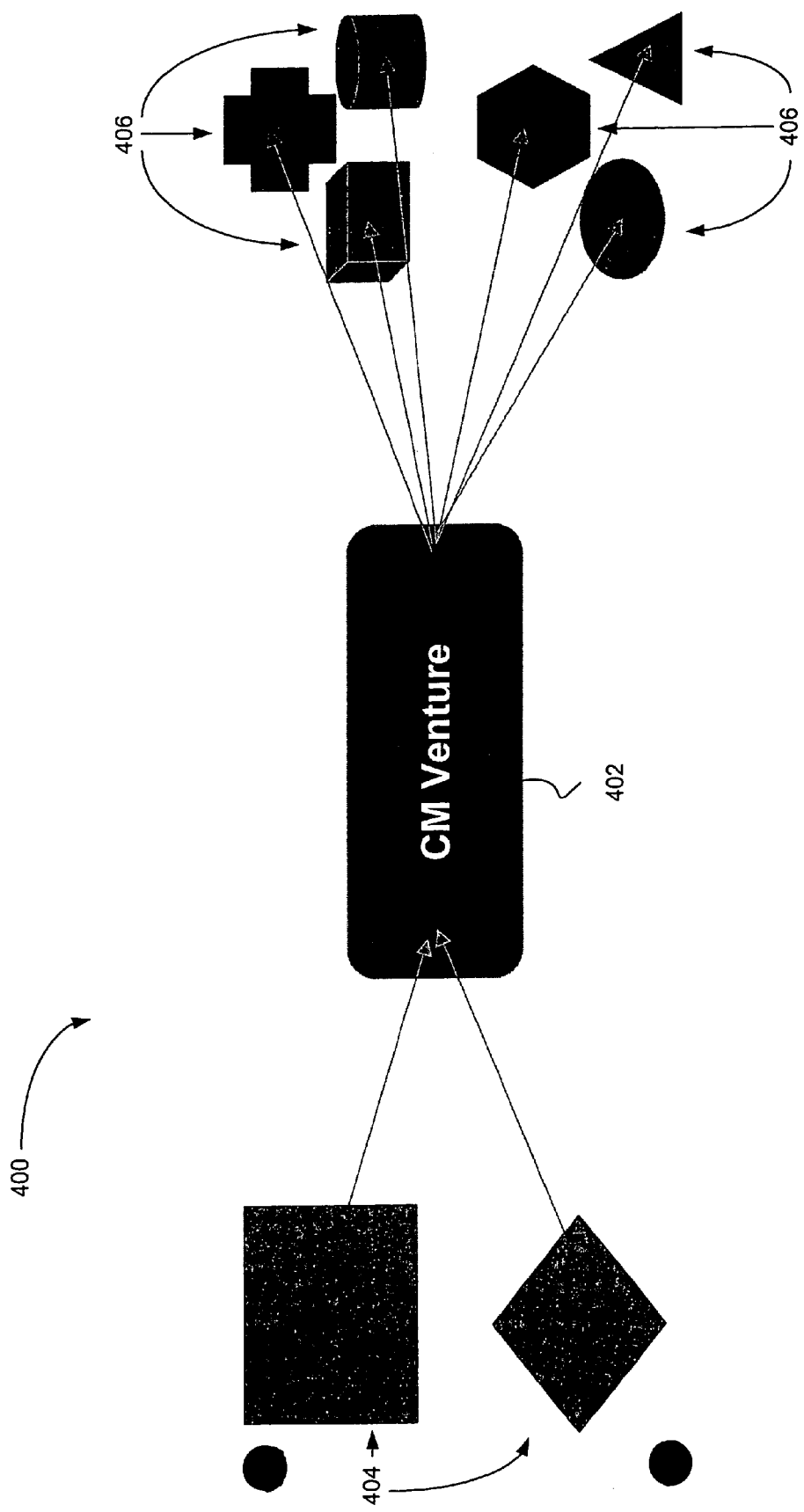
FIG. 4 is an illustration showing a system flow for affording a matchmaking utility in a contract manufacturing framework, in accordance with one embodiment of the present invention.

FIG. 4 is an illustration showing a system flow 400 for affording a matchmaking utility in a contract manufacturing framework, in accordance with one embodiment of the present invention. The system flow 400 includes a matchmaking utility 402, pharmaceutical companies 404, and contract manufacturing organizations 406.

In use, pharmaceutical companies 404 search for contract manufacturing organizations 406 utilizing the matchmaking utility 402 of the present invention. As discussed in greater detail subsequently, the matchmaking utility 402 streamlines the process of finding, qualifying, selecting, and contracting with contract manufacturing organizations 406.

For the pharmaceutical companies 404 the streamlined process provided from the present invention allow increased revenues due to faster time to market for their products. In addition, the present invention allows pharmaceutical companies 404 access to a larger pool of contract manufacturing organizations 406, provides lower procurement costs, and lower ongoing operating costs.

For the contract manufacturing organizations 406, the present invention provides increased sales leads and project requests. In addition, the present invention provides lower business development costs, and increased revenues.

Figure 5:
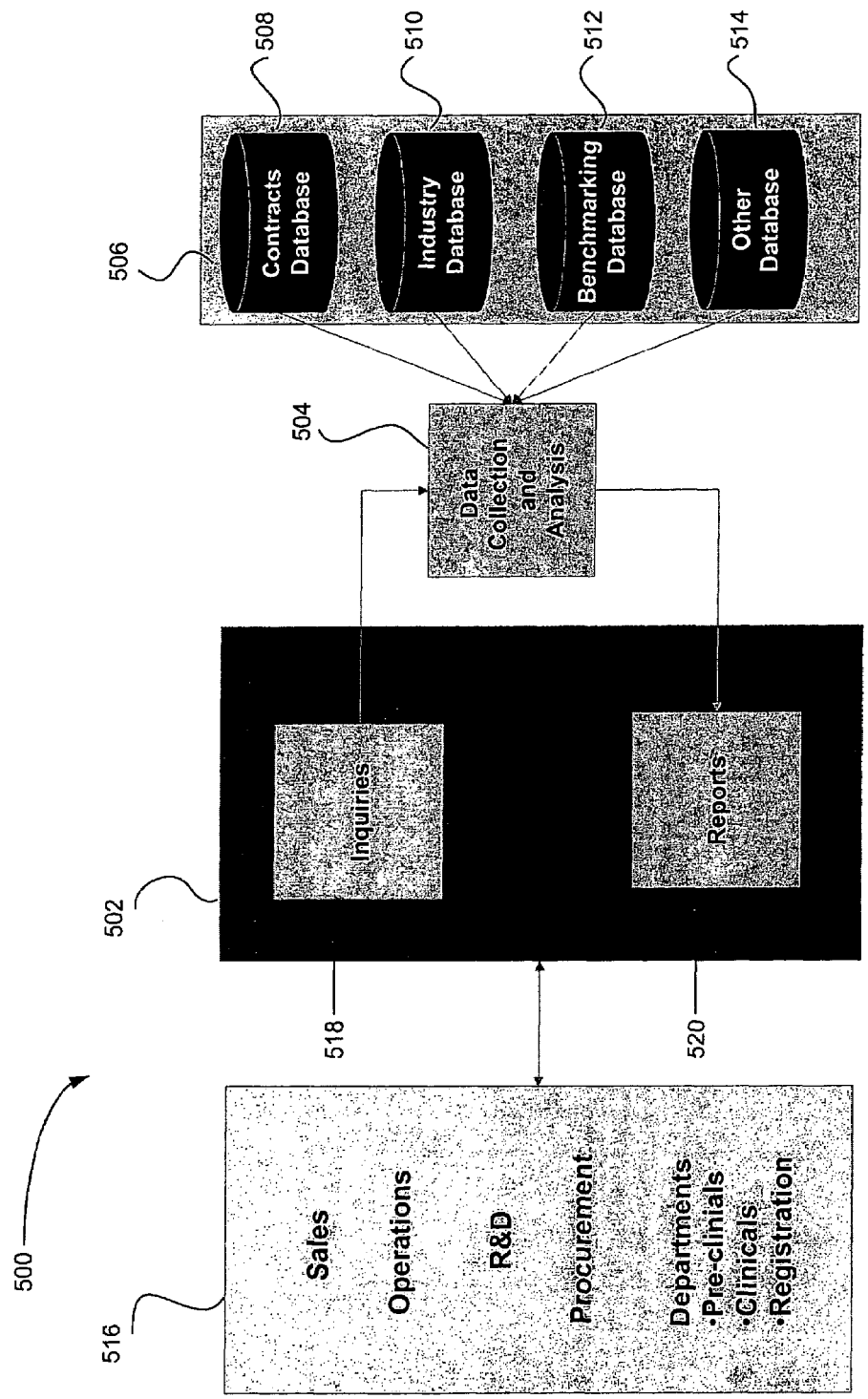
FIG. 5 is an illustration showing a web enabled matching system for affording a matchmaking utility in a contract manufacturing framework, in accordance with one embodiment of the present invention.

FIG. 5 is an illustration showing a web enabled matching system 500 for affording a matchmaking utility in a contract manufacturing framework, in accordance with one embodiment of the present invention. The web enabled matching system 500 includes a user interface 502, a data collection and analysis backend 504, and a system database 506. The system database 506 preferably includes a contracts database 508, an industry database 510, a benchmarking database 512, and other database databases 514 as required for a particular system.

In use, the web enabled matching system 500 receives inquires 518 from users 516, such as pharmaceutical companies. Typically, these inquiries 518 are received via a network, such as the Internet, utilizing the user interface 502. The user interface 502 then provides the received inquires 518 to the data collection and analysis backend 504. The data collection and analysis backend 504 then processes the inquiry 518 utilizing the system database 506. Depending on the type of inquiry 518 received, a particular database, such as the contracts database 508 or industry data 510, is utilized to process the inquiry 518.

After processing, the data collection and analysis backend 504 generates a report 520. The report 520 is then made available to the user 516 utilizing the user interface 502. Advantageously, the present invention may be utilized to assist sales departments, operations departments, research and development departments, and procurement departments.

Figure 6:
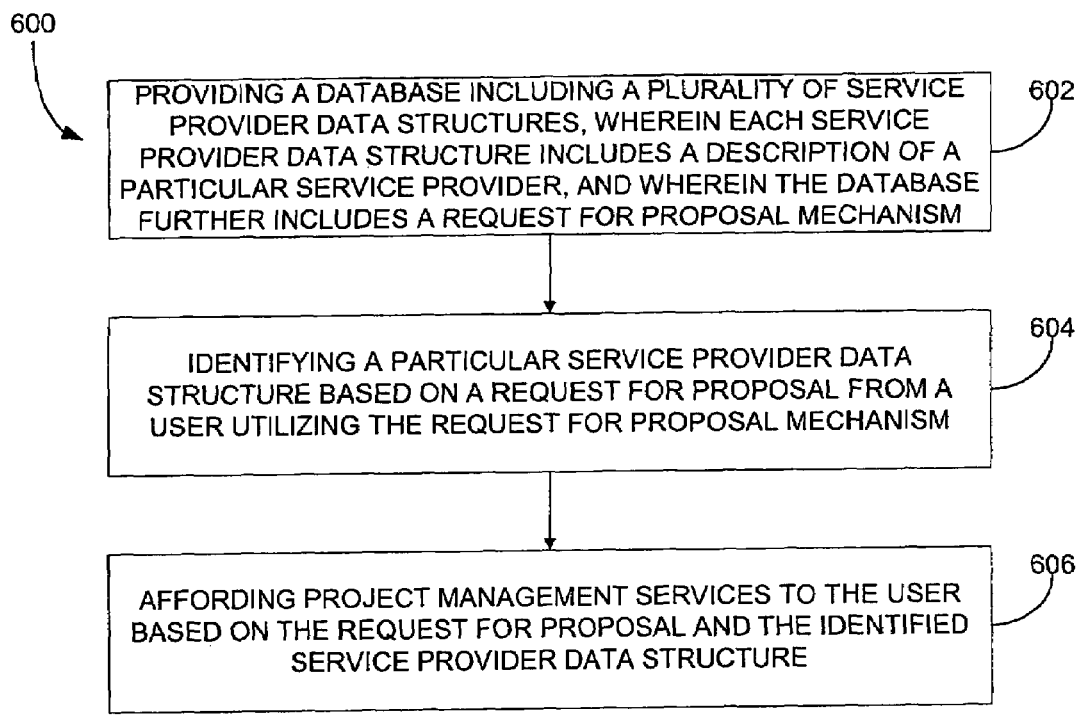
FIG. 6 is a flowchart illustrating a method for affording supply chain/workflow services in a contract manufacturing framework, in accordance with an embodiment of the present invention.

FIG. 6 is a flowchart illustrating a method 600 for affording supply chain/workflow services in a contract manufacturing framework, in accordance with an embodiment of the present invention. First, in operation 602, a database including a plurality of service provider data structures is provided, wherein each service provider data structure includes a description of a particular service provider, and wherein the database further includes a request for proposal mechanism. Next, in operation 604, a particular service provider data structure is identified based on a request for proposal from a user utilizing the request for proposal mechanism. Finally, project management services are afforded to the user based on the request for proposal and the identified service provider data structure. See operation 606.

In one embodiment of the present invention, a status of manufacturing processes performed by the identified service provider may be tracked. Optionally, the user may be allowed to inquiry service engineers. Also optionally, the user may be allowed to inquiry service chemists.

In one aspect of the present invention, the database may be accessed utilizing a network. Optionally, wherein the network may be the Internet.

Figure 7:
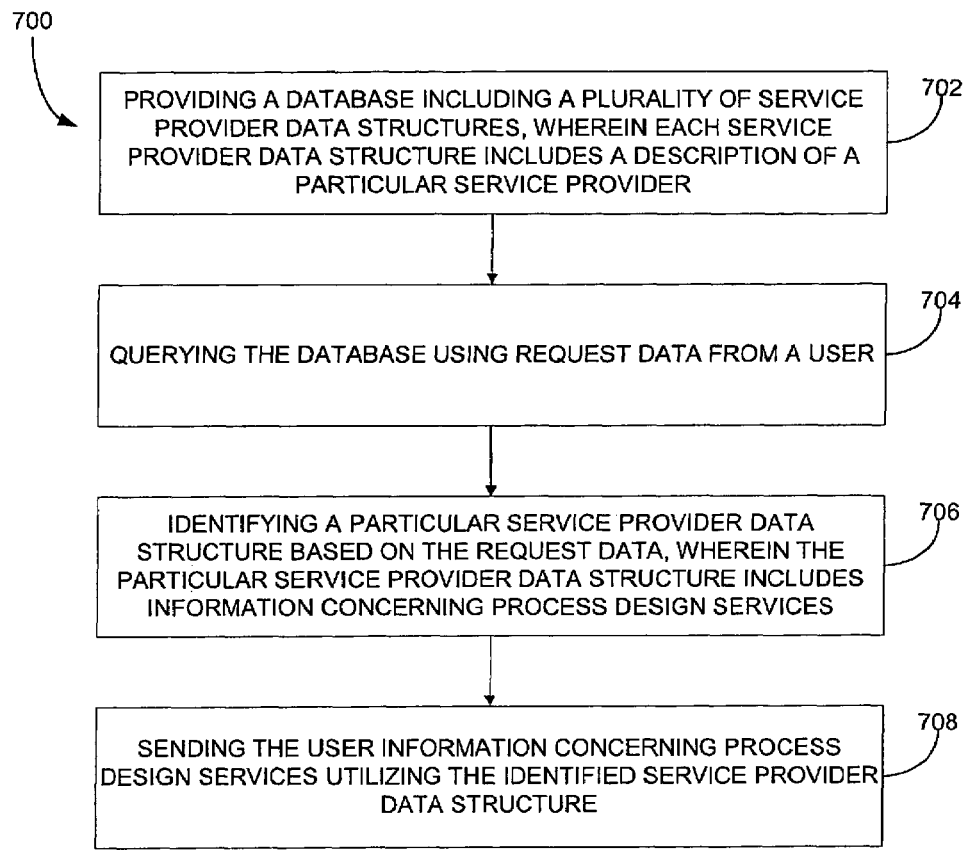
FIG. 7 is a flowchart illustrating a method for affording technical services in a contract manufacturing framework, in accordance with an aspect of the present invention.

FIG. 7 is a flowchart illustrating a method 700 for affording technical services in a contract manufacturing framework, in accordance with an aspect of the present invention. First, in operation 702, a database including a plurality of service provider data structures is provided, wherein each service provider data structure includes a description of a particular service provider. Then, the database is queried using request data from a user as indicated in operation 704. A particular service provider data structure is then identified based on the request data in operation 706, wherein the particular service provider data structure includes information concerning process design services. Finally, the user is sent information concerning process design services utilizing the identified service provider data structure. See operation 708.

In one embodiment of the present invention, the identified service provider data structure may include information concerning optimization services. In another embodiment, the identified service provider data structure may include information concerning technical experts available for consultation.

In one aspect of the present invention, the technical experts available for consultation may include engineering consultation services. In another aspect, the database may be accessed utilizing a network. Optionally, the network may be the Internet.

Figure 8:
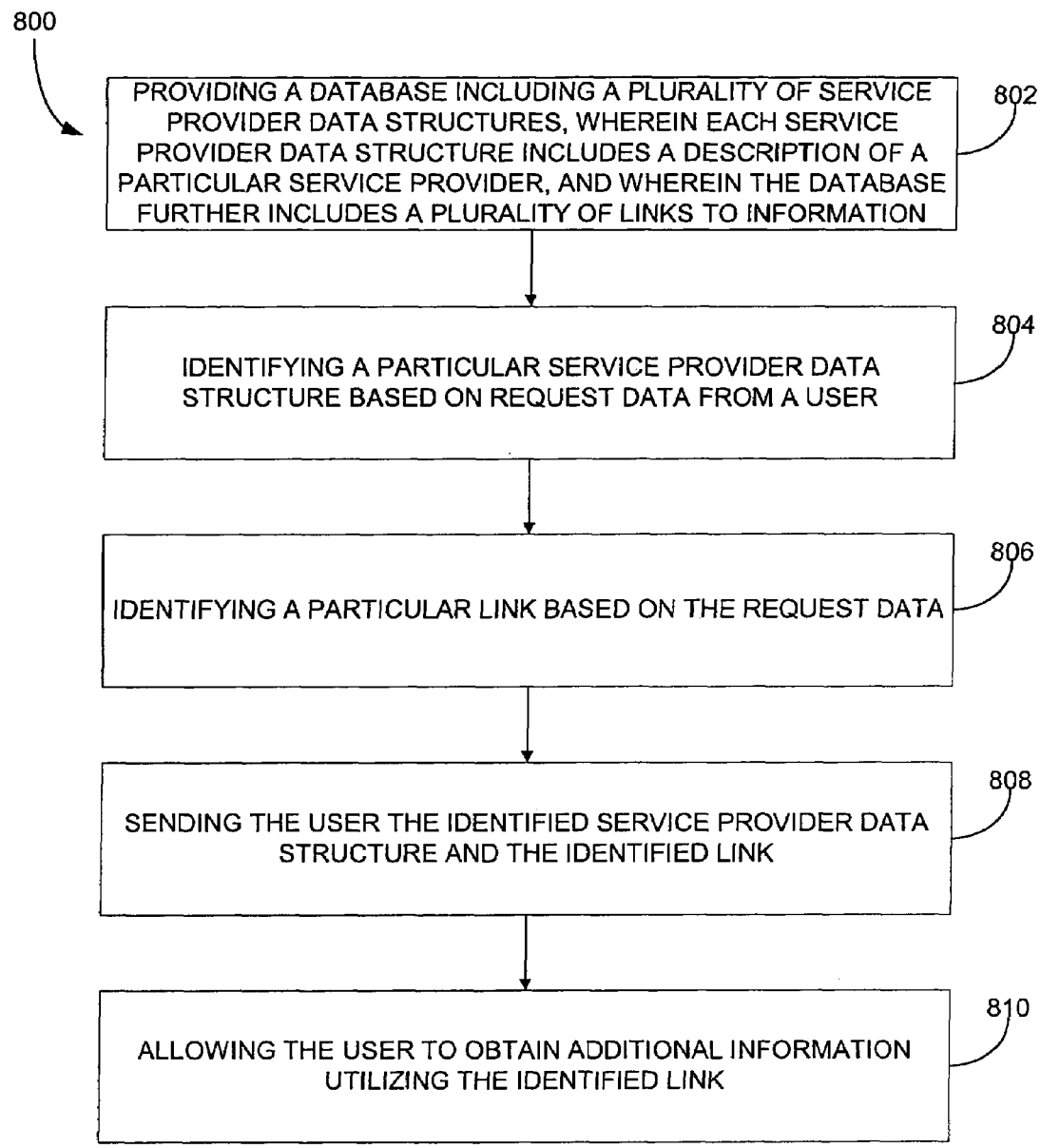
FIG. 8 is a flowchart illustrating a method for affording an information portal in a contract manufacturing framework, in accordance with an embodiment of the present invention.

FIG. 8 is a flowchart illustrating a method 800 for affording an information portal in a contract manufacturing framework, in accordance with an embodiment of the present invention. First, in operation 802, a database including a plurality of service provider data structures is provided, wherein each service provider data structure includes a description of a particular service provider, and wherein the database further includes a plurality of links to information. Then, in operation 804, a particular service provider data structure is identified based on request data from a user. A particular link is identified based on the request data as indicated in operation 806. In operation 808, the user is then sent the identified service provider data structure and the identified link. Finally, the user is allowed to obtain additional information utilizing the identified link. See operation 810.

In one embodiment of the present invention, the service provider data structures may include data concerning contract service providers. Optionally, the service provider data structures may further include data concerning legal services.

In one aspect of the present invention, the identified link may be capable of being utilized to obtain information concerning patent licensing. Optionally, the identified link may be capable of being utilized to obtain information concerning multi-country licensing. In another aspect, the database is accessed utilizing a network. Additionally, the network may be the Internet.

Figure 9:
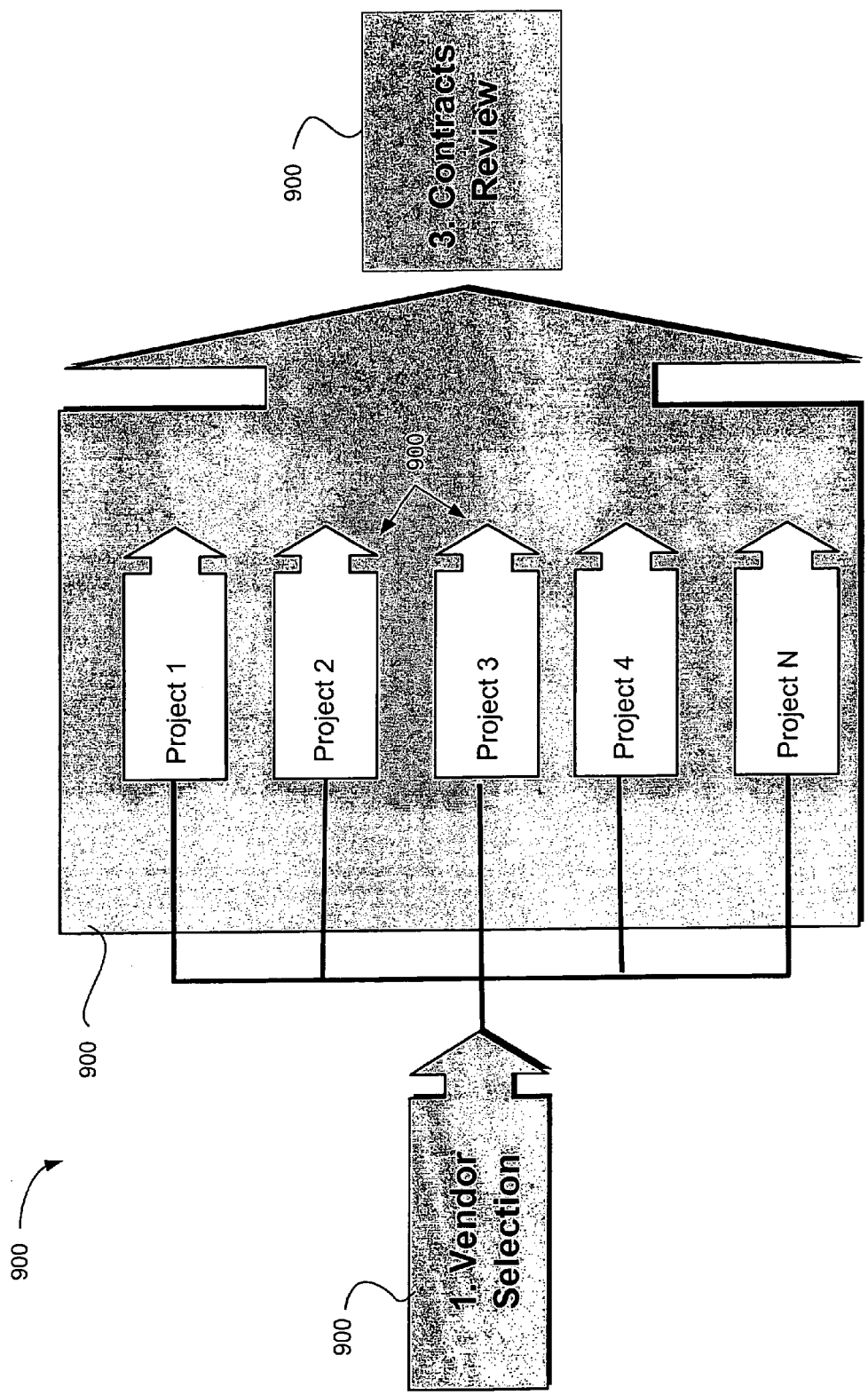
FIG. 9 is an illustration showing a web portal system for affording an information portal in a contract manufacturing framework, in accordance with an embodiment of the present invention.

FIG. 9 is an illustration showing a web portal system 900 for affording an information portal in a contract manufacturing framework, in accordance with an embodiment of the present invention. The web portal system 900 includes a vender selection subsystem 902, a contract management subsystem 904, and a contracts review subsystem 906.

In operation, the web portal system 900 provides venders to potential users utilizing the vender selection subsystem 902. For example, a pharmaceutical company user may utilize the vender selection subsystem 902 to obtain information on contract manufacturing organizations to develop select products.

The present invention also provides users with contract management via the contract management subsystem 904. The contract management subsystem 904 provides management for various projects 908 that a particular vender may be performing for the user. Finally, the present invention provides contract review utilizing the contracts review subsystem 906.

Figure 10:
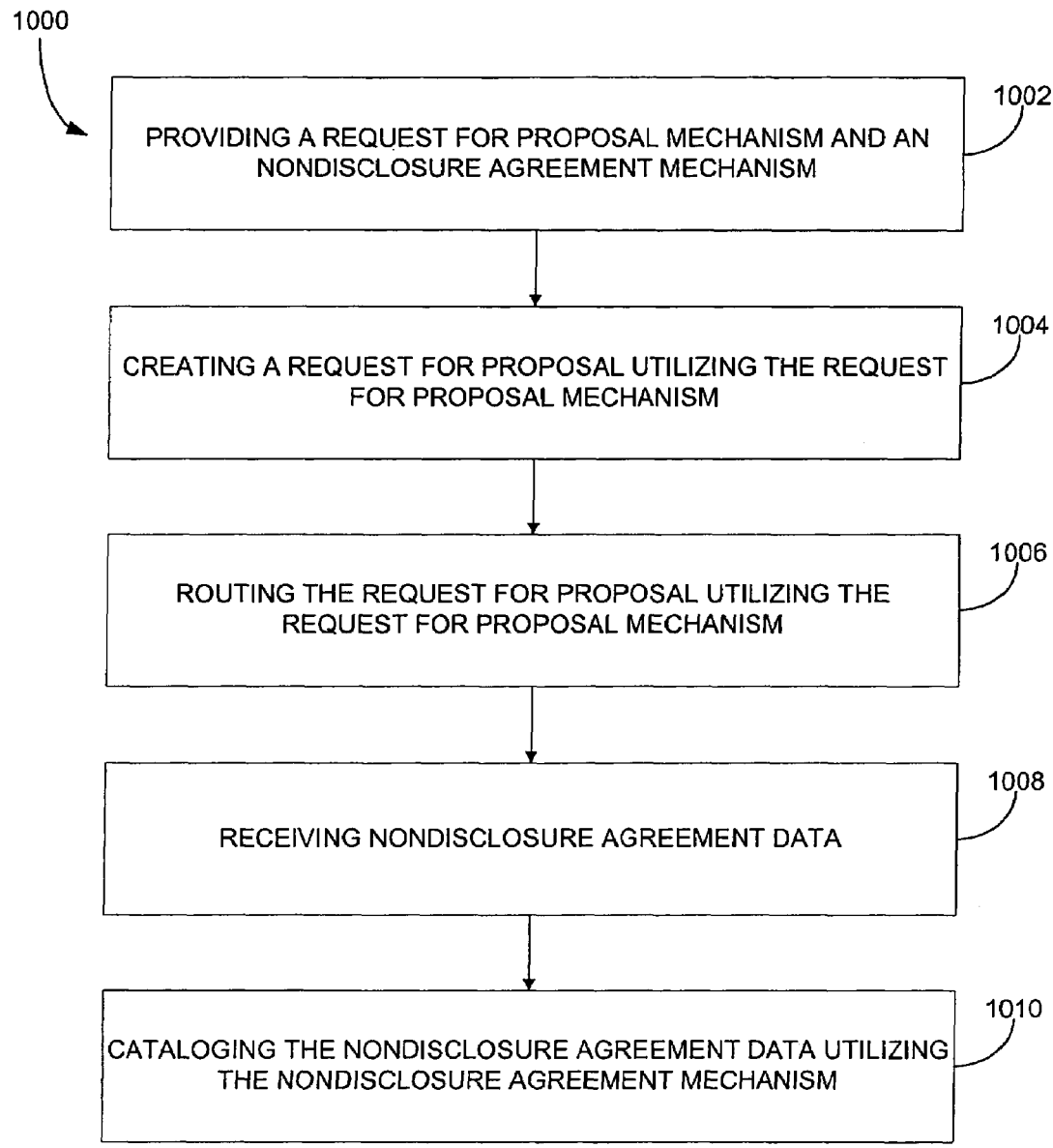
FIG. 10 is a flowchart showing a method for affording transaction services in a contract manufacturing framework, in accordance with an embodiment of the present invention.

FIG. 10 is a flowchart showing a method 1000 for affording transaction services in a contract manufacturing framework, in accordance with an embodiment of the present invention. First, in operation 1002, a request for proposal mechanism and an nondisclosure agreement mechanism are provided. Then, in operation 1004, a request for proposal is created utilizing the request for proposal mechanism. The request for proposal is then routed utilizing the request for proposal mechanism. See operation 1006. Next, in operation 1008, nondisclosure agreement data is received. Finally, the nondisclosure agreement data is cataloged utilizing the nondisclosure agreement mechanism as indicated in operation 1010.

In one embodiment of the present invention, the nondisclosure agreement data may be sent utilizing the nondisclosure agreement mechanism. In another embodiment, the created request for proposal may be a product request for proposal.

In one aspect of the present invention, the created request for proposal may be a services request for proposal. In another aspect, the database may be accessed utilizing a network. Optionally, the network may be the Internet.

Figure 11:
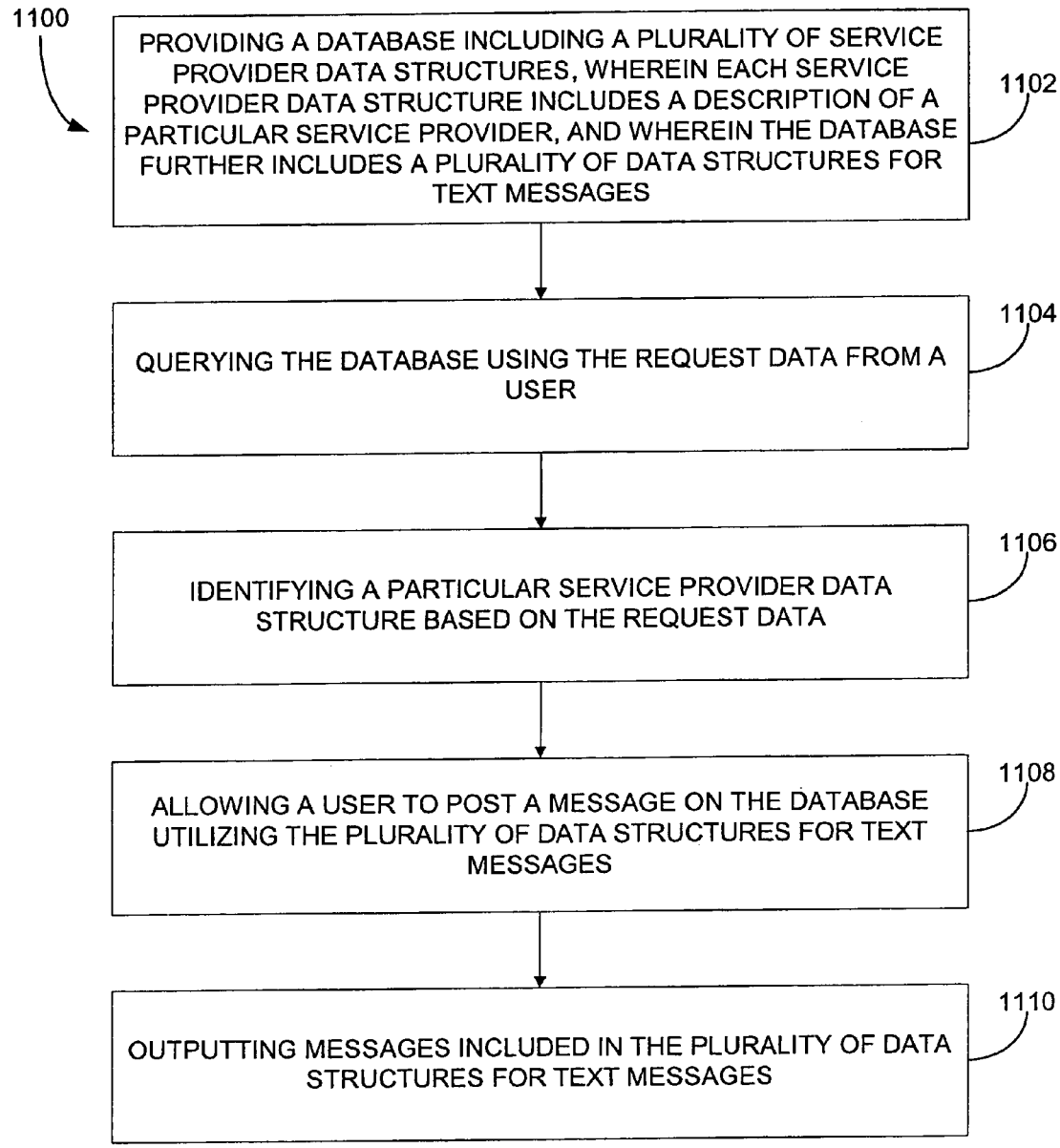
FIG. 11 is a flowchart illustrating a method for affording a discussion/forum in a contract manufacturing framework, in accordance with an embodiment of the present invention.

FIG. 11 is a flowchart illustrating a method 1100 for affording a discussion/forum in a contract manufacturing framework, in accordance with an embodiment of the present invention. First, in operation 1102, a database including a plurality of service provider data structures is provided, wherein each service provider data structure includes a description of a particular service provider, and wherein the database further includes a plurality of data structures for text messages. Then, the database is queried using the request data from a user, in operation 1104. A particular service provider data structure is then identified based on the request data. See operation 1106. Next, in operation 1108, a user is allowed to post a message on the database utilizing the plurality of data structures for text messages. Finally, messages included in the plurality of data structures for text messages are outputted as indicated in operation 1110.

In one embodiment of the present invention, a user may be allowed to personalize a website stored on the database. In another embodiment, at least one message located on the database includes information concerning a trade show. Optionally, the service provider data structures may include data concerning contract service providers.

In one aspect of the present invention, the database may accessed utilizing a network. Optionally, the network may the Internet.

The present invention may be utilized for many different types of industries in addition to the pharmaceuticals industry. For example, the present invention is ideal for an eSupply chain model, as discussed in greater detail subsequently.

eSupply Chain Model

Figure 12:
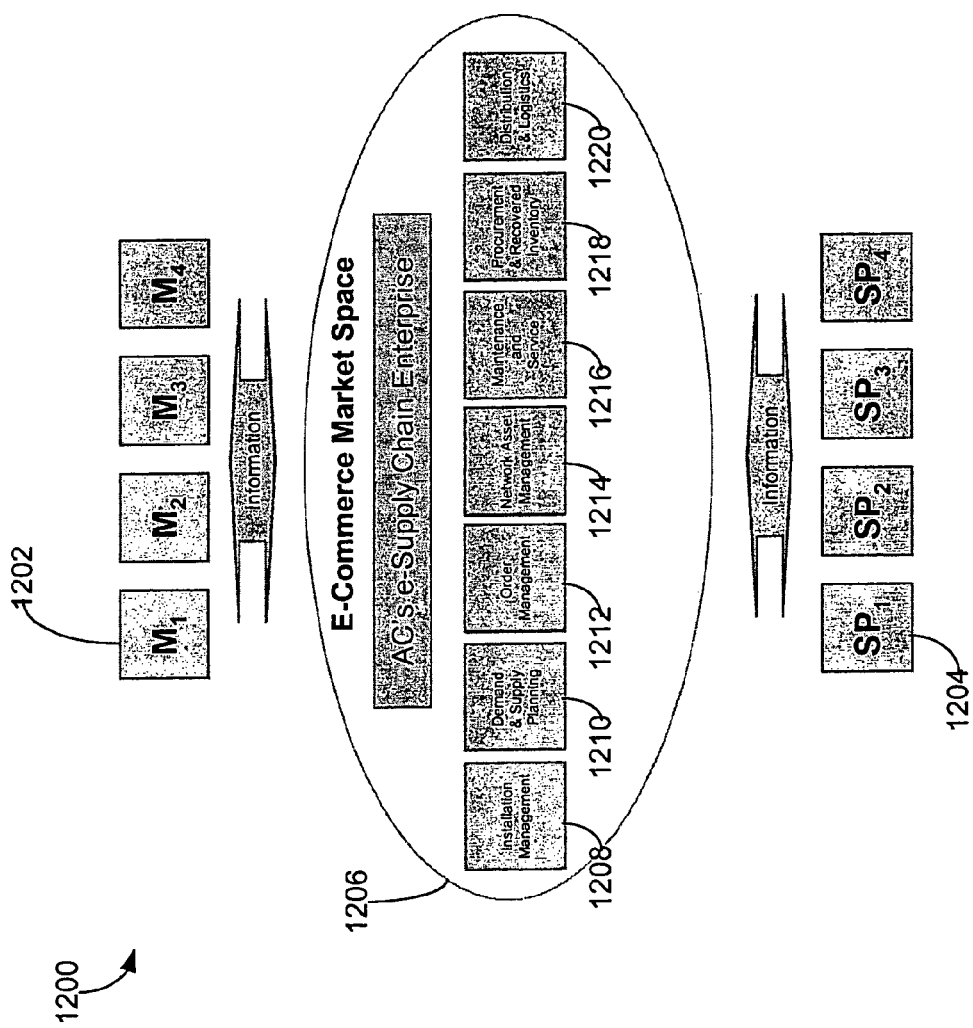
FIG. 12 illustrates an illustrative embodiment of a system for combined industry supply management between one or multiple manufacturers and one or many service providers and/or vendors and/or resellers.

FIG. 12 illustrates an illustrative embodiment of a system 1200 for combined industry supply management between one or multiple manufacturers 1202 and one or many service providers 1204 and/or vendors and/or resellers, etc. For clarity, the majority of the following discussion will discuss service providers, but it should be kept in mind that the present invention will operate equally well with vendors, resellers, etc.

In more detail, the present invention manages the supply chain between the manufacturer(s) and service provider(s). The industry supply management is centralized in an eCommerce Market Space 1206, which includes components that manage end-to-end supply chain information such as demand planning, order fulfillment, scheduling, inventory, etc. In embodiments of the present invention in which multiple manufacturers and service providers participate, some of the benefits of the present invention include: economies of scale are enabled, rationalization of procurement and inventory, rationalization of distribution and logistics facilities, and facilitation of the development of an industry-wide standard. More benefits will be set forth below in the discussion of FIG. 14.

Preferably, the group of manufacturers of such a system each has a common logistics profile and limitations. The manufacturers may focus on production core competence and would also be responsible for strategic and tactical optimization of network assets.

Also preferably, the group of service providers have common network profiles. The service providers may focus on customers, new businesses and channels, etc. Further, under the system of the present invention, the service providers would be allowed to migrate from operations focus to strategic technology and market management.

The components may include some or all of an installation management component 1208, a demand and supply component 1210, an order management component 1212, a network asset management component 1214, a maintenance and service component 1216, a procurement and recovered inventory component 1218, and/or a distribution and logistics component 1220.

Figure 13:
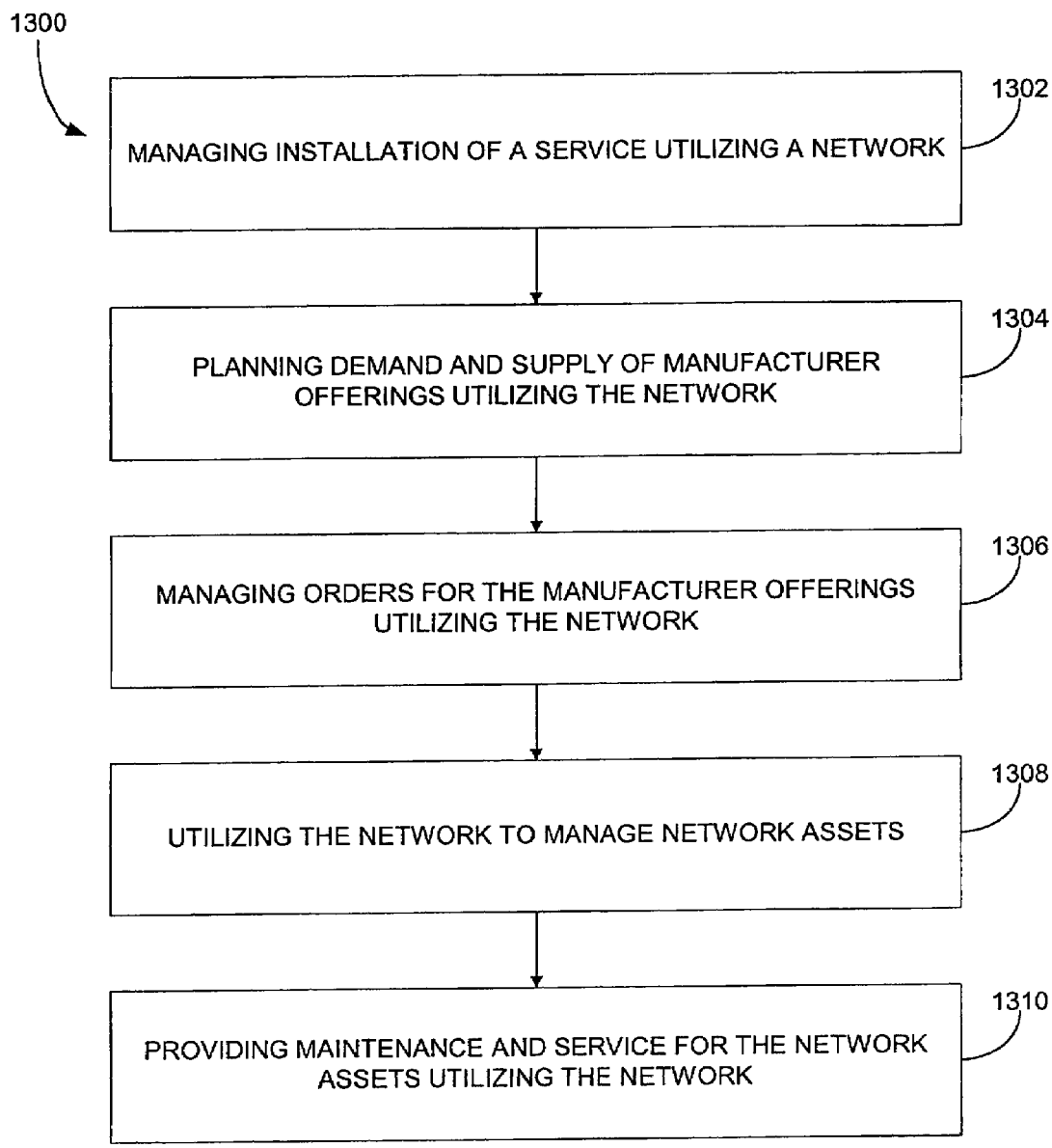
FIG. 13 illustrates a flowchart for a process for affording a network-based supply chain framework in accordance with an embodiment of the present invention.

FIG. 13 illustrates a flowchart for a process 1300 for affording a network-based supply chain framework in accordance with an embodiment of the present invention. Installation of a service is managed utilizing a network in operation 1302. Demand and supply of manufacturer offerings are planned utilizing the network in operation 1304 and orders for the manufacturer offerings are also managed utilizing the network in operation 1306. The network is also utilized to manage network assets including providing maintenance and service for the network assets utilizing the network (see operations 1308 and 1310).

Benefit Areas

Figure 14:
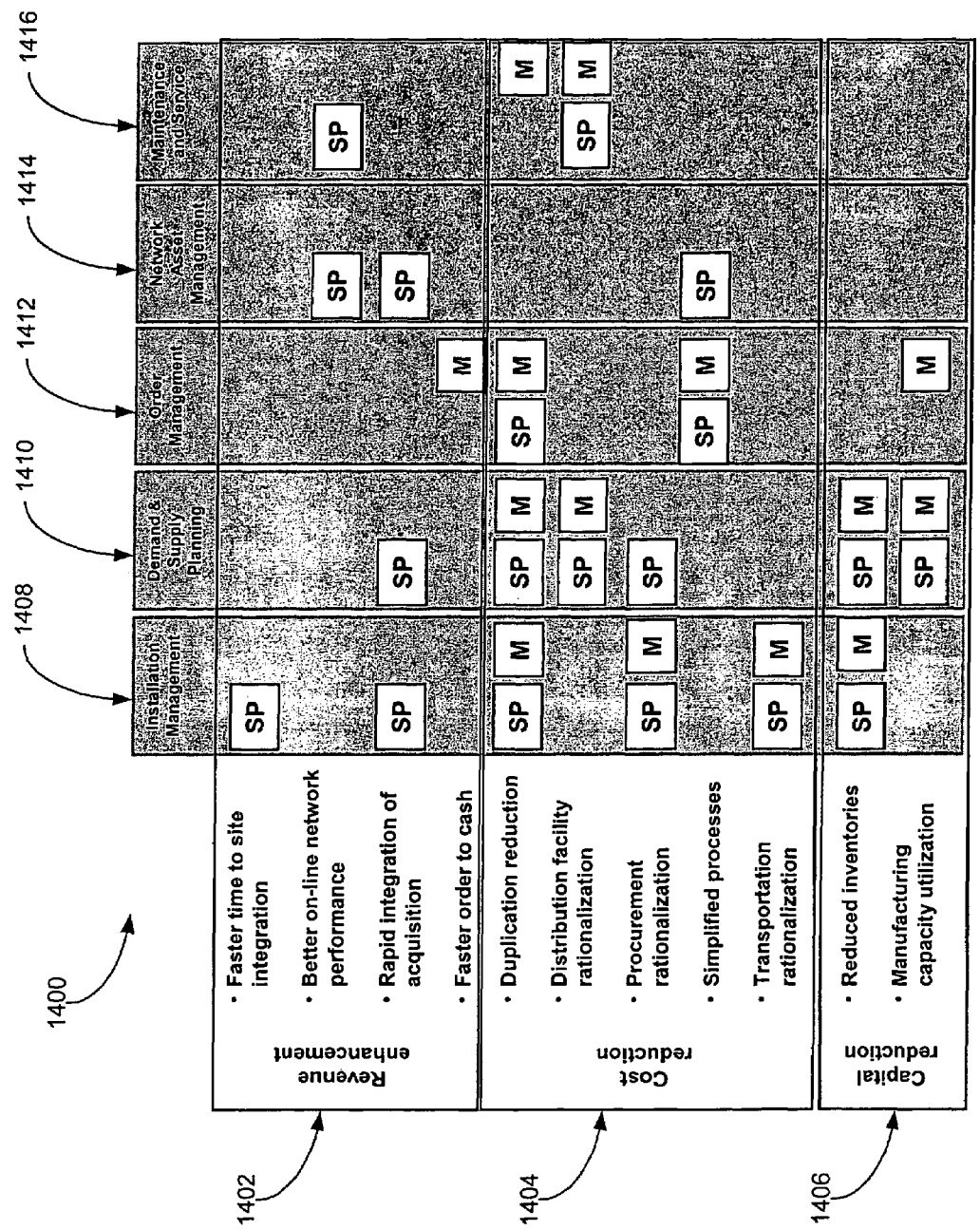
FIG. 14 is a chart illustrating the relations between benefit areas and components of the e-Commerce Market Space in accordance with an embodiment of the present invention.

FIG. 14 is a chart 1400 illustrating the relations between benefit areas and components of the e-Commerce Market Space in accordance with an embodiment of the present invention. The benefit areas include a revenue enhancement benefit area 1402, a cost reduction benefit area 1404, and a capital reduction benefit area 1406.

Each benefit area includes a number of associated benefits. Illustrative benefits associated with revenue enhancement 1402 include: (a) faster time to site integration; (b) better on-line network performance; (c) rapid integration of acquisition; and (d) faster order to cash. Illustrative benefits associated with cost reduction 1404 include: (a) duplication reduction; (b) distribution facility rationalization; (c) procurement rationalization; (d) simplified processes; and (e) transportation rationalization. Illustrative benefits associated with capital reduction 1406 include: (a) reduced inventories; and (b) manufacturing capacity utilization. FIG. 14 also includes a plurality of columns for various components of the present invention. These columns may include an Installation Management component column 1408, a Demand and Supply Planning component column 1410, an Order Management component column 1412, a Network Asset Management component column 1414, and a Maintenance and Service component column 1416.

Displayed under each column in FIG. 14 are rectangular boxes that each have either a "SP" or a "M" displayed inside them. The "SP" boxes indicate that a particular benefit for that particular component may be attributed to a service provider. The "M" boxes indicate that a particular benefit for that particular component may be attributed to a manufacturer.

As an example, in an illustrative embodiment of the present invention, the Installation Management component, may include the following benefits to the service provider by looking at FIG. 14 in closer detail: faster time to site integration, rapid integration of acquisition, duplication reduction, procurement rationalization, transportation rationalization, and reduced inventories. In this illustrative embodiment, the Installation Management component may also include the following benefits to the manufacturer: duplication reduction, procurement rationalization, transportation rationalization, and reduced inventories.

With continuing reference to FIG. 14, in this illustrative embodiment of the present invention, benefits for the service provider under the Demand and Supply Planning component may include the following: rapid integration of acquisition, duplication reduction, distribution facility rationalization, procurement rationalization, reduced inventories, and manufacturing capacity utilization. Further, benefits for the manufacturer under the Demand and Supply Planning component in this illustrative embodiment of the present invention may include the following: duplication reduction, distribution facility rationalization, reduced inventories, and manufacturing capacity utilization.

With regards to the Order Management component for this illustrative embodiment, benefits for the service provider may include the following (as illustrated in FIG. 14): duplication reduction, and procurement rationalization. Benefits for the manufacturer under the Order Management component in this illustrative embodiment of the present invention may include: faster order to cash, duplication reduction, simplified processes, and manufacturing capacity utilization.

Turning now to the Network Asset Management component column, benefits for the service provider for the Network Asset Management component may include: better on-line network performance, rapid integration of acquisition, and simplified processes.

Lastly, in this illustrative embodiment of the present invention, benefits for the service provider under the Maintenance and Service component may include: better on-line network performance, and distribution facility rationalization. Benefits for the manufacturer under the Maintenance and Service component may include: duplication reduction, and distribution facility rationalization.

Figure 15:
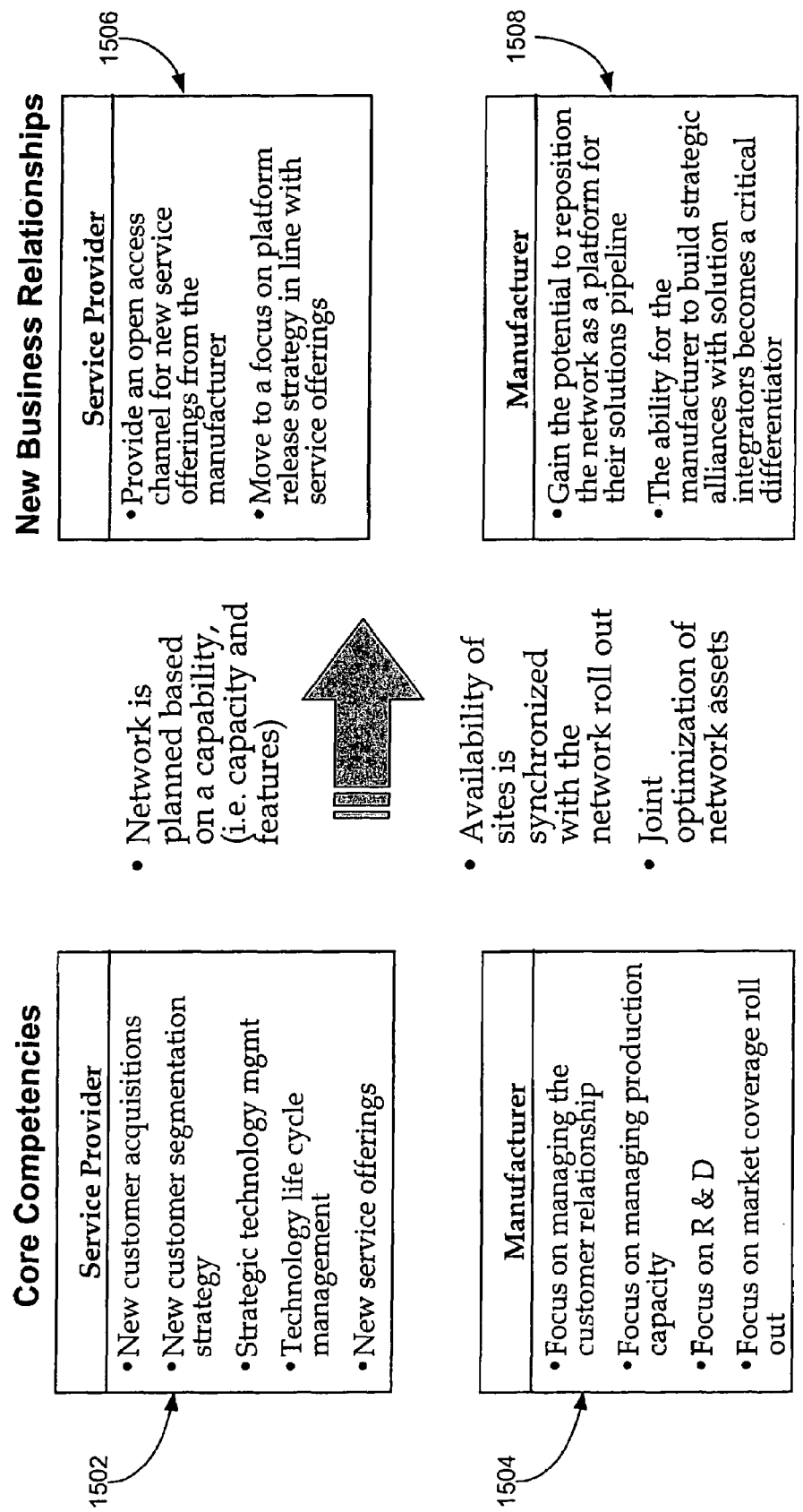
FIG. 15 is a schematic illustration of the relationship between areas of core competence of both operators and manufacturers for creating an environment for new business relationships in accordance with an embodiment of the present invention.

FIG. 15 is a schematic illustration of the relationship between areas of core competence of both operators and manufacturers for creating an environment for new business relationships in accordance with an embodiment of the present invention. In such an embodiment, core competencies of a service provider 1502 may include: new customer acquisitions, new customer segmentation strategy, technology life cycle management, and new service offerings. Core competencies of a manufacturer 1504 may include: focus on managing the customer relationship, focus on managing production capacity, focus on research and development ("R&D"), and focus on market coverage roll out. In such an embodiment, the network may be planned based on a capability, such as capacity and features. Availability of sites may be synchronized with the network roll out and network assets may be jointly optimized.

With continuing reference to FIG. 15, the creating of an environment for new business relationships with respect to the service provider 1506 provides an open access channel for new service offerings from the manufacturer so that focus may be moved on a platform release strategy in line with service offerings. The environment for new business relationships with respect to the manufacturer 1508 may allows for the gaining of the potential to reposition the network as a platform for their solutions pipeline where the ability for the manufacturer to build strategic alliances with solution integrators becomes a critical differentiator.

Figure 16:
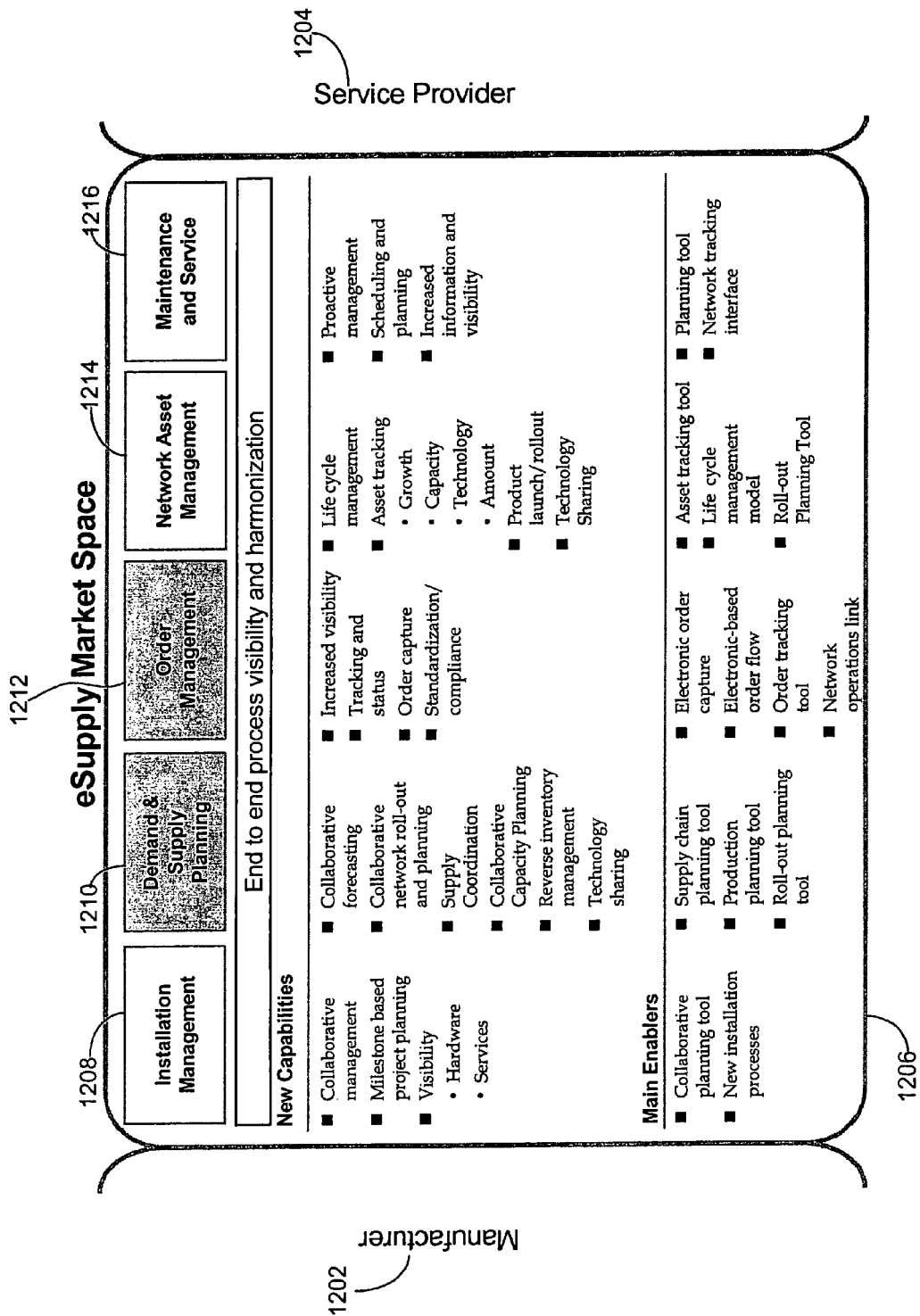
FIG. 16 illustrates some of the components in the eCommerce Market Space and illustrative capabilities of the components.

FIG. 16 illustrates some of the components in the eCommerce Market Space and illustrative capabilities of the components.

Installation Management 1208

Figure 17:
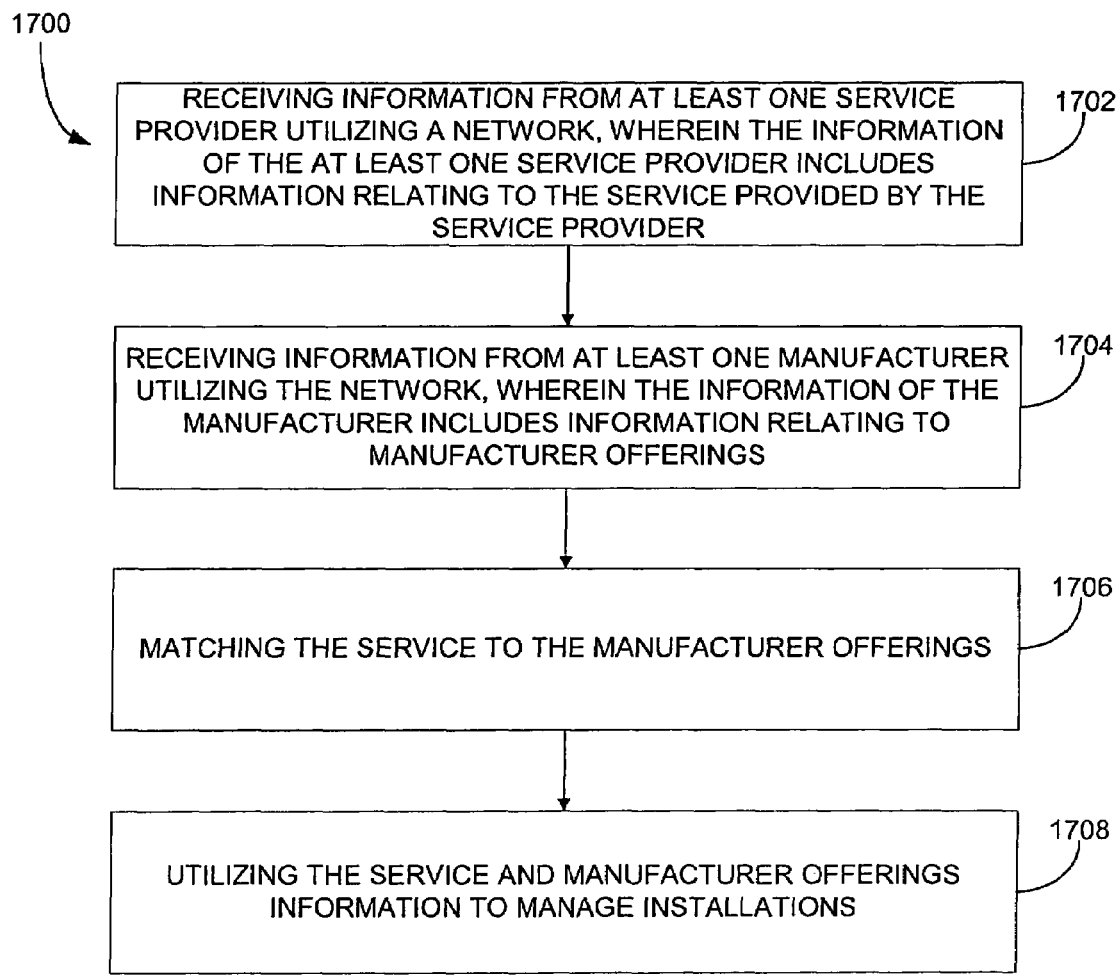
FIG. 17 illustrates a flowchart for a methodology for installation management utilizing a network in accordance with an embodiment of the present invention.

FIG. 17 illustrates a flowchart for a methodology 1700 for installation management utilizing a network in accordance with an embodiment of the present invention. In operation 1702, information is received from at least one service provider utilizing a network. This information includes information relating to the service provided by the service provider. Also received utilizing the network is information from at least one manufacturer in operation 1704. This information includes information relating to manufacturer offerings. The service is matched in operation 1706 to the manufacturer offerings and the service and manufacturer offerings information are utilized to manage installations in operation 1708.

In an embodiment of the present invention, collaboration between the matched service provider and the manufacturer may also be managed. In such an embodiment, the management of collaboration may include facilitating the transmitting of information between the matched service provider and the manufacturer utilizing the network. In an aspect of this embodiment, a collaborative planning tool may be provided for managing the collaboration between the matched service provider and the manufacturer.

In another embodiment of the present invention, milestone based project planning may be facilitated between the matched service provider and the manufacturer. In a further embodiment, the manufacturer offerings of the matched manufacturer may be displayed to the matched service provider and services provided by the matched service provider may be displayed to the matched manufacturer utilizing the network.

In an aspect of the present invention, the information of the manufacturer may include information relating to the availability of the manufacturer offerings. In such an aspect, the service provider may be notified of the availability of the manufacturer offerings that match the service installation information.

In one example of the present invention particularly applicable to installation of communication lines between telecommunications providers and their suppliers, a method is provided for use in cooperation with a computer having memory in a Synchronous Optical Network (SONET) for generating an optimized transition plan for the placement of Self-Healing Rings (SHR) and the routing of point-to-point demand in accordance with projected customer demand over a selected multi-period time interval.

SONET is both a standard and a set of specifications for building high speed, digital communications networks that run over fiberoptic cables while interfacing with existing electrical protocols and asynchronous transmission equipment. Fiberoptics has revolutionized telecommunications in view of the large bandwidth availability (currently estimated in the hundreds of gigabits per second) which continues to increase with technological advances such as wave-division multiplexing and similar developments in light polarization and dispersion-shifted fibers.

As those skilled in the art will recognize, SONET specifies a digital hierarchy based on Optical Carrier (OC) rather than electrical levels. SONET does define Synchronous Transport Signals (STS), however, which are electrical interfaces used as the multiplexing mechanisms within SONET Network Elements (NE). Network elements combine STS-1s as needed up to STS-N where N is the number of STS-1s, then convert the total electrical multiplex to an optical carrier and transmit it over optical fiber. SONET is multiplexed at the byte level, allowing services to be dynamically placed into the broadband STS for transport. The basic SONET of 64 Kbps per byte is the same speed as the conceptual voice channel DS0 allowing SONET to easily integrate all currently used digital services into the optical hierarchy.

One of the principal benefits of SONET is that it allows for the direct multiplexing of current network services, such as DS1, DS1C, DS2, and DS3 into the synchronous payload of STS-1. As those skilled in the art will recognize, the above rates, as in the case of most defined rates, were developed based on existing transmission systems. For example, the DS1 and DS2 signal rates (1.544 million bits per second and 6.312 million bits per second) are the transmission rates of the T1 and T2 wire pair carrier systems. Initially, one multiplexer, called an M12, was used to combined four DS1 channels into a DS2, and a second multiplexer, called an M23, was used to combine seven DS2 channels into a DS3. Presently, most networks use a single multiplexer termed an M13, which combines twenty-eight DS1 channels into a DS3. Of course, one of the key attributes of these previous multiplexer designs is that they permit DS1 signals to be timed independently, i.e. asynchronous multiplexing. Bits can therefore be sent at different transmission rates because individual channels need not be synchronized to a common timing source.

The asynchronous DS3 multiplexing standard was implemented in the days when most networks utilized analog technology and the few digital systems in existence generated their own clocking systems. Significantly, the transmission specifications for DS1 signals specify that the bit rate is 1.544 million bits per second, plus or minus 75 bps. To compensate for this range, additional bits must therefore be "stuffed" into each DS1 signal before they are multiplexed to a higher rate. Again, as those skilled in the art will recognize, while bit stuffing supports independently clocked input signals, it also makes it nearly impossible to locate individual DS1 or DS0 channels within a DS3 bit stream. To extract a single channel, a DS3 signal would need to first be demultiplexed through M13 components into twenty-eight DS1s before the channels could be switched or rearranged. As a result, the process of adding or deleting channels is expensive.

In contrast to asynchronous multiplexing, the SONET standard defines a viable alternative which supports greater capacity and efficiency. In the SONET multiplexing format, the basic signal transmission rate—STS-1—operates at 51.84 million bits per second. AN STS-1 can carry 28 DS1 signals or one asynchronous DS3. STS-1 signals are then multiplexed to produce higher bit rates—STS-2, STS-3, etc. As referenced above, the other term used to define the SONET signal levels is optical carrier. The bit rates are the same in each case, so the bit rate of the STS-1 equals the bit rate of the OC-1. The only difference is the type of signal that is being referenced. For example, if the signal is in an electrical format, it is referred to as an STS. Similarly, if the signal is in an optical format—compatible with a fiber medium—it is referred to as an OC.

The SONET standards define an alternative to asynchronous DS3 multiplexing, which describes how to divided STS signals into lower speed increments, i.e. virtual tributaries. The major advantage of synchronous multiplexing is that when DS1 and other low-speed channels are multiplexed directly into the STS format, the lower speed channels can be identified and reconfigured for drop-and-insert. As a result, the drop-and-insert process can be done simpler with less expense of hardware then the back-to-back M13 multiplexers used in asynchronous multiplexing.

Because of the large bandwidth availability in fiber, and the growing volume of data traffic, disruptions from link and node failures due to cable cuts, for example, become increasingly serious. Network survivability has therefore become a major concern for SONET designers and has fueled interest in what is known in the art as "ring" architectures. Such architectures take advantage of the capability provided by synchronous multiplexing in SONET to eliminate the need to backhaul traffic to central hubs. Thus, at each switching office, the SONET transport node directly accesses the required time slots in the bit stream through the use of modified Add-Drop Multiplexers (ADM). The SONET ring topology permits the creation of highly survivable networks which are viewed in the communications industry as essential for obtaining business for critical data communications.

In most cases, the deployment of SONET rings results in cost savings since it is far less expensive for carriers to install a fiber ring then to deploy point-to-point links. Consider, for example, a rural route, where linking remote terminals to a central office in a point-to-point application would require six multiplexers—one at each site and at the Central Office (CO) for each route—and six fibers, two to each site. In a ring topology, all that is required is one multiplexer at the CO and two fibers that go through a multiplexer at each site for a total of four multiplexers and two fibers. Significantly, in the ring topology, working or service traffic is routed in one direction only. If that fiber fails, traffic is rerouted on a protection fiber to flow in the opposite direction. In this manner, working traffic bypasses the failure to get to its proper destination.

Against this background, it is readily seen that there is significant debate in the communications industry regarding the type and location of rings, and in particular, Self-Healing Rings (SHR) to deploy. As those skilled in the art will recognize, the directionality of service routing and the protection mechanism are key attributes that distinguish different self-healing ring architectures. For example, a unidirectional ring routes service traffic in only one direction of the ring. On the other hand, a bidirectional ring routes the components of a duplex circuit in opposite directions on the ring. Similarly, in a path-switched ring, traffic is protected on a per path basis, and the switching is based on the health of each individual path where it exits the ring. Still further, in a line-switched ring, switching is based on the health of the line between each pair of nodes. Thus, when a line is faulty, the entire line is switched off to a protection loop at the failure's boundaries.

The method and system of this example of the present invention utilizes selected mixed-integer programs to efficiently model the information obtained during the iterative steps of the present invention in cooperation with a computer having sufficient memory. Such steps include the determination of nodes within the SONET under review, identification of the number of periods within the selected time interval, the determination of demand between nodes over this time period, preferably in units of DS3, and the determination of discounted add-drop costs for a plurality of selected Add/Drop Multiplexers (ADM's) and related components based upon projected availability. If the number of nodes under review is small, once this information is determined, then the optimized discounted fixed and interconnection costs for this plurality of ADM's may be determined in accordance with a first selected mixed integer program. An electrical signal may thereafter be generated for receipt by the computer memory corresponding to a set of logical self-healing rings with preliminary, albeit detailed, routing information. In contrast, when the number of nodes under review is large, a heuristic approach is required.

In the heuristic approach, the user is required to load traffic to existing rings by repetitively identifying the smallest point-to-point demand between nodes on existing rings and assigning this demand to the rings until no demand left may be routed. Thereafter, a proposed ring is created by identifying the greatest unsatisfied point-to-point demand between two adjacent nodes and assigning the nodes to the ring. At this point, new proposed rings may either be randomly generated until all demand has been satisfied or, in the alternative, existing rings may be expanded. If the latter step is selected, expansion is carried out by repetitively calculating the largest unsatisfied demand of neighbor nodes for each of the proposed rings and identifying a plurality of neighbor nodes having the greatest unsatisfied demand. At that point, a determination may be made regarding the deficit of each of the proposed rings as well as the identification of a plurality of proposed rings with the greatest deficit.

Finally, one of the rings with the greatest deficit may be assigned to one of the neighbor nodes and inter-ring traffic may be loaded until all demand has been routed. Traffic is loaded through a process of repetitively identifying demand that can be routed the greatest distance through the smallest number of proposed rings and assigning that demand accordingly. At this point, an electrical signal is summarily generated also for receipt by said computer memory and corresponding to a set of logical self-healing rings with preliminary routing information.

Once logical rings have been determined, whether in accordance with a mixed integer program or through repetitive iterations such as in the heuristic approach, the placement of physical self-healing rings and optimal traffic routing may thereafter be determined by retrieving the logical SHR and preliminary routing information from memory and maximizing the percentage of demand covered and minimizing the total inter-ring traffic cost. This is accomplished through modeling the same in accordance with yet another mixed integer program and generating a corresponding electrical signal for receipt by said computer memory.

Demand and Supply Planning 1210

Figure 18:
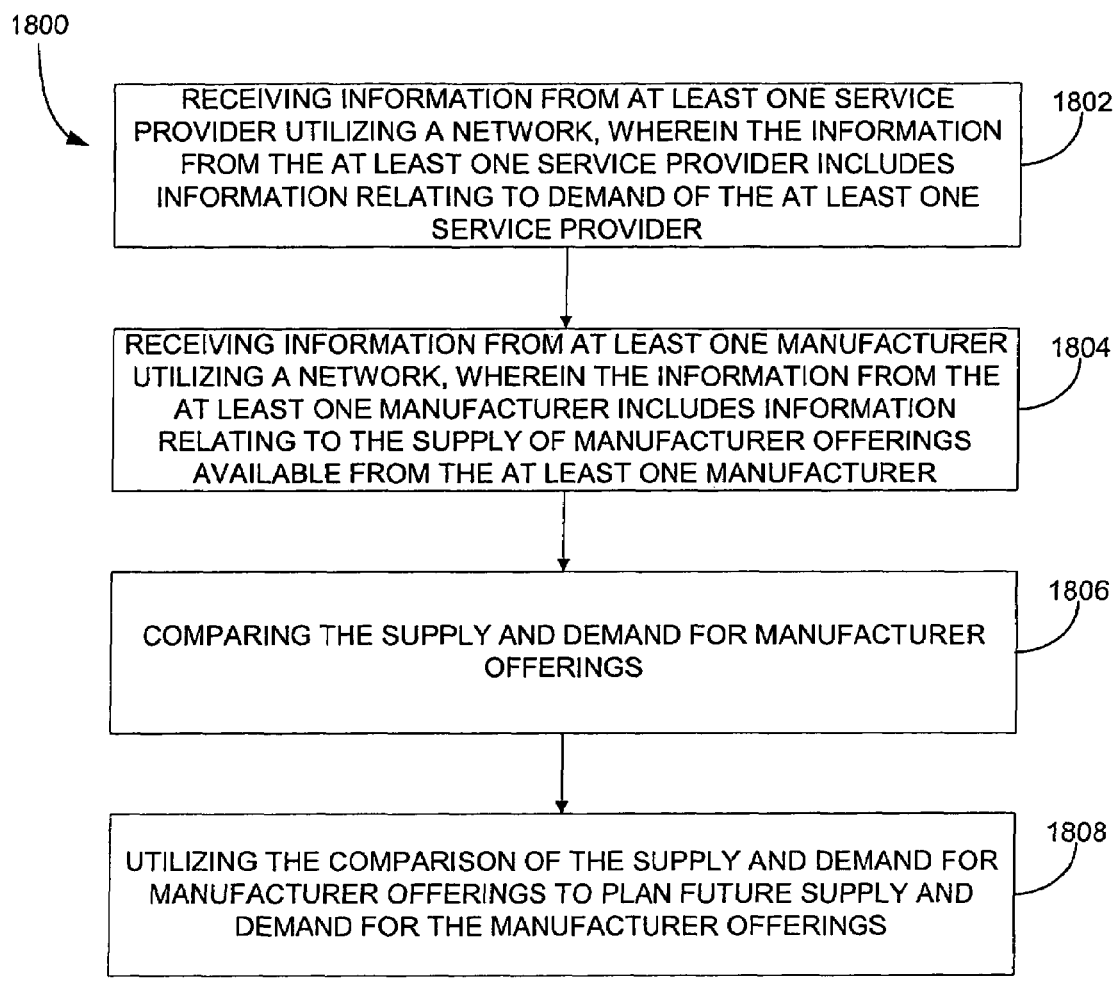
FIG. 18 illustrates a flowchart for a process for demand and supply planning utilizing a network where information from one or more service providers relating to demand of the service providers is received utilizing the network in operation, in accordance with an embodiment of the present invention.

In accordance with an embodiment of the present invention, FIG. 18 illustrates a flowchart for a process 1800 for demand and supply planning utilizing a network where information from one or more service providers relating to demand of the service providers is received utilizing the network in operation 1802. Received in operation 1804 utilizing the network is information from one or more manufacturers relating to the available supply of manufacturer offerings. The supply and demand for manufacturer offerings are compared to one another in operation 1806 and this comparison is used in operation 1808 to plan future supply and demand for the manufacturer offerings.

In an embodiment of the present invention, collaborative forecasting may also be facilitated between service providers and manufacturers utilizing the network. In another embodiment of the present invention, collaborative network roll-out and planning utilizing the network may be facilitated between service providers and manufacturers. As an option, a roll-out planning tool may be provided for facilitating collaborative network roll-out and planning between the service providers and the manufacturers utilizing the network. In a further embodiment of the present invention, the supply of manufacturer offerings between manufacturers and service providers may be coordinated utilizing the network. In such an embodiment, a supply chain planning tool may be provided for coordinating the supply of manufacturer offerings between the manufacturers and the service providers utilizing the network.

In even another embodiment of the present invention, collaborative capacity planning may also be facilitated between service providers and manufacturers utilizing the network. In one aspect of this embodiment, a production planning tool may be provided for facilitating the collaborative capacity planning. In yet a further embodiment of the present invention, reverse inventory management may be conducted between the at least one service provider and the at least one manufacturer utilizing the network. Also, the sharing of technology between service providers and manufacturers may be facilitated utilizing the network.

One exemplary embodiment of the present invention is adapted primarily for monitoring and controlling customer power demand in a utility such as electric, gas, and water. In particular, this embodiment of the present invention is designed for the collection and transmission of user demand requirements and the control of user demand for utility services.

Domestic residential demand for electric power is growing at approximately 2% annually. Although utility companies can maintain pace with this growth by constructing more peaking and power plants, this is not necessarily in the best interest of the utility companies and society at large. The factors of cost, fuel availability, and environmental concerns of both the utility company and the public in general have prompted a shift of emphasis from building additional generation capacity for satisfying the increasing demand to developing and employing a method and means of efficiency improvements, production facility optimization, and electrical conservation through demand side management. Implicit in this is the fact that not all electric power costs the same to generate. Power generated during peak times is more expensive than "base-line" power. For demand side management, utility companies will charge on a cost basis rather than an average use basis that has existed in the past.

Heretofore, systems have been proposed for communicating utility usage at a customer's home to a central office. For example, U.S. Pat. No. 4,086,434 discloses a remote condition reporting system including a microprocessor with memory and a firmware program, telephone dialing equipment, a clock, and a plurality of inputs from meter readings and the outputs of sensors. The system initiates telephone calls to the utility company central offices at predetermined intervals to report utility usage including time of day power usage metering.

This embodiment of the present invention includes a monitoring and control system in which communication occurs through a fully distributed digital telecommunications switch without a centralized routing and handling facility. The distribution network is deployable to large numbers of residential and commercial customers for bi-directional real-time communication. While initially designed for use with an electric power utility, the invention is applicable in monitoring and controlling demand for other utilities such as gas or water, as well as for data services.

A controlled load management and feedback system includes a power company central computer facility, a plurality of home monitoring and control networks, and one or more wide band distribution networks interconnecting home monitoring and control networks and the central computer facility. The distribution networks connect to one or more central computer systems through substation gateways via high-speed digital lines.

The home monitoring and control network is located and operated within the power utility customer's home and includes electrical control, monitoring, and measurement devices which allow the utility to monitor electrical consumption in real time, assist the customer in optimizing electrical power consumption, and communicate real-time consumption and changes in consumption to the power utility via the distribution network. Further, the home network permits automatic meter reading and remote service disconnect and reconnect.

The distribution network includes a wire-based (hybrid fiber/coaxial cable) distribution system and an intelligent utility unit (IUU), which interfaces with the home network. The IUu controls, communicates, and configures devices within the home network, and communicates information from the home network back to the utility central computer via the distribution system. The distribution network is configured in cells or small hubs which support 250-2,000 users at a time.

The utility central computer includes a T-based communication digital backbone network which communicates with a distribution network through gateways typically located within a power substation. The backbone network consolidates traffic from different substations and routes the traffic to the utility host computer, thus providing access to every user on the system. The host computer is able to forecast trends and predict when demand will exceed supply, thus allowing corrective action to be taken. The computer can also generate reports for utility management and consumers showing usage and savings through demand management.

Order Management 1212

Figure 19:
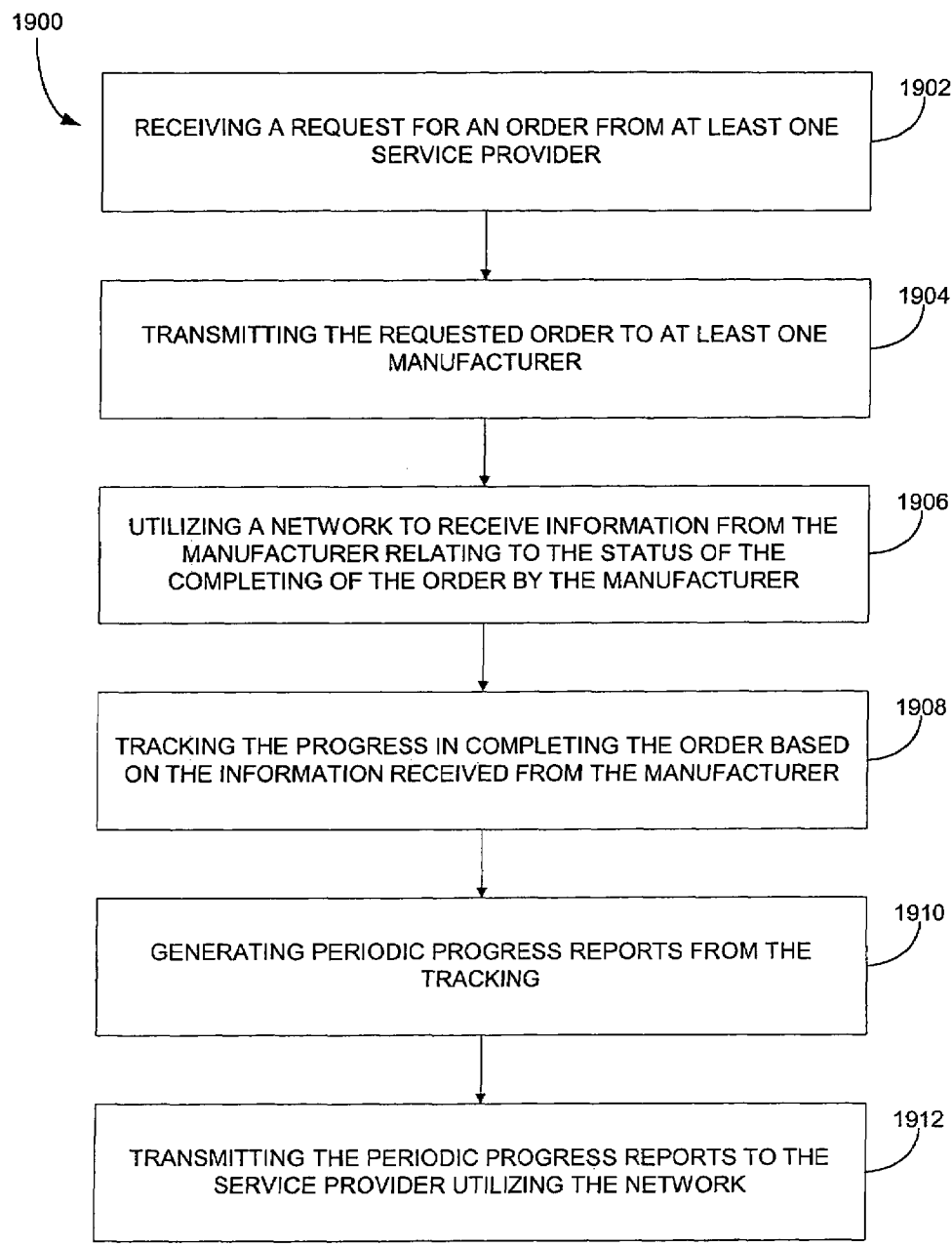
FIG. 19 illustrates a flowchart for a methodology for managing orders in a network-based supply chain in accordance with an embodiment of the present invention.

FIG. 19 illustrates a flowchart for a methodology 1900 for managing orders in a network-based supply chain in accordance with an embodiment of the present invention. When a request for an order is received from a service provider in operation 1902, the request is subsequently transmitted to one or more manufacturers in operation 1904. A network is utilized in operation 1906 to receive information from the manufacturer relating to the status of the completing of the order by the manufacturer. The manufacture's progress in completing the order is tracked in operation 1908 based on the information received from the manufacturer. Periodic progress reports are generated from the tracking and then transmitted to the service provider utilizing the network in operations 1910 and 1912.

In an aspect of the present invention, the order request may be received from the service provider utilizing the network. Similarly, in another aspect of the present invention, the requested order may be transmitted to the at least one manufacture utilizing the network. As an option, an order tracking tool may be provided from tracking the completion of the order.

In one embodiment of the present invention, the network may also be utilized to receive information from suppliers of the manufacturer relating to the status of delivering supplies to the manufacturer as well as to track the progress in supplying the manufacturer based on the information received from the at least one supplier. In such an embodiment, the periodic progress reports may also include information relating to the tracking of the at least one supplier. In yet a further aspect of the present invention, a network operations link may be provided for linking to the at least one service provider and the at least one manufacturer.

An illustrative embodiment of the present invention unitarily and automatically manages ordering processes based on order information supplied by a particular department or section. In order to achieve this, there is provided an order management system for automatically placing an order with one of a plurality of suppliers when order information is input by one of a plurality of orderers. Accordingly, this embodiment of the present invention includes a terminal unit provided to each of the orderers. The terminal unit includes means for inputting the order information, which is then transmitted to a communication network. A central management unit receives the order information from the terminal unit through the communication network. The central management unit includes collection processing means for managing order history information and section information with respect to each orderer. The collection processing means calculates a total cost of previous orders based on the order history information of one of the orderers sending the order information and order information sent from the one of the orderers. The central management unit also includes order permission means for permitting an execution of an ordering process when the calculated total of the previously ordered costs is within a budget of the orderer. The budget may be included in the section information.

Since an ordering process is executed only when the total cost of the previous orders for each of the orderers which may correspond to each department or section in a company, each department or section placing an order can be prevented from exceeding their budget.

The central management unit may further include a supplier selecting process for calculating a total cost of previously received order for each of the suppliers based on the order history information and the order information, and for selecting one of the suppliers whose total cost of previously received orders is within an order limit. Thus, exceeding the order limit previously set to each of the suppliers is prevented.

Additionally, the supplier selecting process may select one of the suppliers based on the order history information so that each of the suppliers equally receives orders. Optionally, the supplier selecting process manages supplier information including an order prohibition flag which represents a prohibition of placing an order with a supplier indicated by the order prohibition flag. As another option, the supplier selecting process selects one of the suppliers offering the lowest price when an item to be ordered is supplied by a plurality of suppliers.

The order management system according to the present invention may further comprise an ordering process for placing an order through the communication network with the suppliers based on the order information.

According to one embodiment of the present invention, an order management process automatically places an order with one of a plurality of suppliers when order information is input by one of a plurality of orderers. The order management process is performed in an order management system which has a plurality of terminal units provided to the respective orderers and a central management unit connected to each of the terminal units. During the management process, order information from one of the terminal units us sent to the central management unit. A total cost of previous orders is calculated based on order history information of one of the orderers sending the order information and order information sent from the one of orderers by managing the order history information and section information with respect to each of the orderers. An execution of an ordering process is permitted when the calculated total cost of previous orders is within a budget of the orderer. The budget may be included in the section information.

According to this embodiment of the invention, since an ordering process is executed only when the total cost of the previous orders for each of the orderers which may correspond to each department or section in a company, each department or section placing an order is prevented from exceeding their budget.

Optionally, the order management process may include calculating a total cost of previously received orders for each of the suppliers based on the order history information and the order information as well as selecting one of the suppliers whose calculated total cost of previously received orders is within an order limit. Thus, exceeding the order limit previously set to each of the suppliers can be prevented.

Additionally, the order management process may further include selecting the one of the suppliers based on the order history information so that each of the suppliers equally receives orders. As an option, an order to be placed with a supplier may be prohibited by indication by an order prohibition flag included in supplier information. As another option, one of the suppliers offering the lowest price may be selected when an item to be ordered is supplied by a plurality of suppliers. As yet another option, the order management process may further include automatically placing an order with the suppliers based on the order information through a communication network connecting the central management unit to each of the suppliers. It should be noted that the order management process may be performed by a combination of a general purpose computer and a processor readable medium such as a memory provided in the computer or a CD-ROM, disk, tape, etc. which stores program information used by the computer.

Network Asset Management 1214

Figure 20:
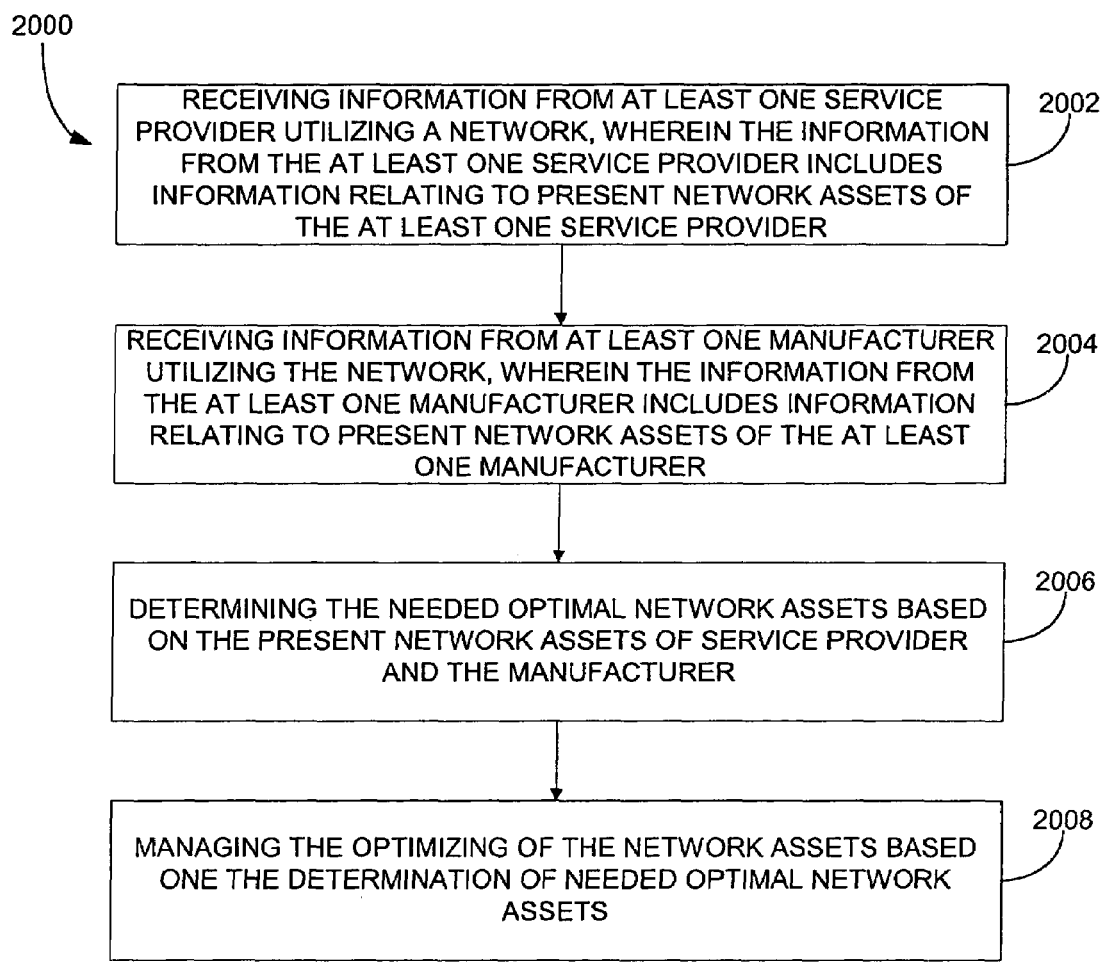
FIG. 20 illustrates a flowchart for a process for managing assets in a network-based supply chain in accordance with an embodiment of the present invention.

FIG. 20 illustrates a flowchart for a process 2000 for managing assets in a network-based supply chain in accordance with an embodiment of the present invention. Utilizing a network, information is received information from at least one service provider in operation 2002. This information includes information relating to present network assets of the service provider. Information is also received utilizing the network from at least one manufacturer in operation 2004. The information from the manufacturers includes information relating to present network assets of the manufacturers. In operation 2006, a determination is made for optimal network assets needed for the service provider and manufacturer based on the present network assets of service provider and the manufacturer. Based on this determination, the optimizing of the network assets is managed in operation 2008. In an embodiment of the present invention, the life cycle of network assets of the service providers and the manufacturers may also be managed utilizing the network. In an aspect of this embodiment, a life cycle management model may be utilized for managing the life cycle of the network assets. In an additional embodiment of the present invention, the sharing of technology between the service providers and the manufacturers may be facilitated utilizing the network utilizing the network.

In another embodiment of the present invention, network assets of the service providers and the manufacturers may be tracked utilizing the network. The network assets may be tracked according to: growth of the network asset, capacity of the network asset, technological level of the network asset, and/or amount of the network asset. In one aspect of this embodiment of the present invention, an asset tracking tool may be utilized for tracking the network assets.

In yet a further embodiment of the present invention, the roll-out of services provided by the service providers and manufacturer offerings provided by the manufacturers may be managed utilizing the network based on the received present network asset information. In such an embodiment, a roll-out planning tool may be utilized for managing the roll-out of services provided by the service providers and manufacturer offerings provided by the manufacturers.

Although only a few embodiments of the present invention have been described in detail herein, it should be understood that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

What is claimed is:

1. In a contract manufacturing framework, a method of providing access to services comprising:

providing a database including a request for proposal ("RFP") mechanism, a nondisclosure agreement mechanism, a plurality of service provider data structures and a plurality of manufacturer data structures, wherein each service provider data structure includes a description of service provided by a particular service provider, and wherein each manufacturer data structure includes a description of offerings of a particular manufacturer;

identifying a particular data structure based on a request for proposal from a user utilizing the request for proposal mechanism, wherein the user is a service provider or a manufacturer;

receiving nondisclosure agreement data from the user wherein the nondisclosure agreement data is based on a nondisclosure agreement initiated with the nondisclosure agreement mechanism that is independently accessible by both the user and a third party using the contract manufacturing framework to initiate the nondisclosure agreement;

storing the nondisclosure agreement data in the database with the nondisclosure agreement mechanism for later retrieval of the nondisclosure agreement data; and affording network-based project management services to the user based on the request for proposal and the identified data structure, wherein affording project management services includes managing assets in a network-based supply chain, including optimizing use of service provider assets and manufacturer assets and providing maintenance and service of service provider assets and manufacturer assets.

2. A method as recited in claim 1, further including the step of tracking a status of manufacturing processes performed by the identified service provider.

3. A method as recited in claim 1, further including the step of allowing the user to inquiry service engineers.

4. A method as recited in claim 1, further including the step of allowing the user to inquiry service chemists.

5. A method as recited in claim 1, wherein the database is accessed utilizing the Internet.

6. A computer program embodied on a computer readable medium for providing supply chain/workflow services in a contract manufacturing framework comprising:

a code segment for providing a database including a request for proposal ("RFP") mechanism and a plurality of service provider data structures and a plurality of manufacturer data structures, wherein each service provider data structure includes a description of service provided by a particular service provider, and wherein each manufacturer data structure includes a description of offerings of a particular manufacturer;

a code segment for identifying a particular data structure based on a request for proposal from a user utilizing the request for proposal mechanism, wherein the user is a service provider or a manufacturer;

a code segment for receiving nondisclosure agreement data from the user wherein the nondisclosure agreement data is based on a nondisclosure agreement initiated with the nondisclosure agreement mechanism that is independently accessible by both the user and a third party using the contract manufacturing framework to initiate the nondisclosure agreement;

a code segment for storing the nondisclosure agreement data in the database with the nondisclosure agreement mechanism for later retrieval of the nondisclosure agreement data; and a code segment for affording network-based project management services to the user based on the request for proposal and the identified data structure, wherein affording project management services includes managing assets in a network-based supply chain, including optimizing use of service provider assets and manufacturer assets and providing maintenance and service of service provider assets and manufacturer assets.

7. In a contract manufacturing framework, a method of providing access to services comprising:

logic for providing a database including a request for proposal ("RFP") mechanism and a plurality of service provider data structures and a plurality of manufacturer data structures, wherein each service provider data structure includes a description of service provided by a particular service provider, and wherein each manufacturer data structure includes a description of offerings of a particular manufacturer;

logic for identifying a particular data structure based on a request for proposal from a user utilizing the request for proposal mechanism, wherein the is a service provider or a manufacturer;

logic for receiving nondisclosure agreement data from the user wherein the nondisclosure agreement data is based on a nondisclosure agreement initiated with the nondisclosure agreement mechanism that is independently accessible by both the user and a third party using the contract manufacturing framework to initiate the nondisclosure agreement;

logic for storing the nondisclosure agreement data in the database with the nondisclosure agreement mechanism for later retrieval of the nondisclosure agreement data; and logic for affording network-based project management services to the user based on the request for proposal and the identified data structure, wherein affording project management services includes managing assets in a network-based supply chain, including optimizing use of service provider assets and manufacturer assets and providing maintenance and service of service provider assets and manufacturer assets.

* * * * *